(12) United States Patent
Dong et al.

(10) Patent No.: US 12,279,292 B2
(45) Date of Patent: Apr. 15, 2025

(54) RESOURCE SCHEDULING METHOD, APPARATUS, AND SYSTEM

(71) Applicant: HUAWEI TECHNOLOGIES CO., LTD., Shenzhen (CN)

(72) Inventors: Lei Dong, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 364 days.

(21) Appl. No.: 17/854,483

(22) Filed: Jun. 30, 2022

(65) Prior Publication Data

US 2022/0330275 A1  Oct. 13, 2022

Related U.S. Application Data

(63) Continuation of application No. PCT/CN2019/130992, filed on Dec. 31, 2019.

(51) Int. Cl.
 *H04W 72/54*  (2023.01)
(52) U.S. Cl.
 CPC ................... *H04W 72/54* (2023.01)
(58) Field of Classification Search
 CPC ..................................... H04W 72/54
 See application file for complete search history.

(56) References Cited

U.S. PATENT DOCUMENTS

| | | |
|---|---|---|
| 2019/0052436 A1 | 2/2019 | Desai et al. |
| 2019/0116586 A1 | 4/2019 | Basu Mallick et al. |
| 2021/0314991 A1* | 10/2021 | Tenny ............... H04W 4/40 |
| 2022/0393805 A1* | 12/2022 | Guo ................ H04L 1/1812 |

FOREIGN PATENT DOCUMENTS

| | | |
|---|---|---|
| CN | 106454687 A | 2/2017 |
| CN | 110536445 A | 12/2019 |
| EP | 3537841 A1 | 9/2019 |

(Continued)

OTHER PUBLICATIONS

Intel Corporation: "Feature Lead Summary for NR-V2X AI—7.2.4.1.4 Resource Allocation Mechanism", 3GPP Draft; R1-1903623, Mar. 3, 2019, XP051690885, total 18 pages.

(Continued)

*Primary Examiner* — Won Tae C Kim
(74) *Attorney, Agent, or Firm* — HAUPTMAN HAM, LLP

(57) ABSTRACT

This application discloses a resource scheduling method, an apparatus, and a system, to provide a resource scheduling manner based on sidelink transmission. The method includes: A scheduling terminal device determines a resource for a sending terminal device to perform sidelink (sidelink) transmission; and the scheduling terminal device sends a first message to the sending terminal device, where the first message is used to indicate the transmission resource, where the resource is specifically used to perform a part or all of the following: transmission of data information, transmission of control information, and transmission of feedback information. A manner in which the scheduling terminal device determines, for the sending terminal device, the transmission resource for data transmission is provided, and is an enriched and complete sidelink-based resource configuration manner.

20 Claims, 16 Drawing Sheets

(56) References Cited

FOREIGN PATENT DOCUMENTS

WO 2016161789 A1 10/2016
WO 2019164353 A1 8/2019

OTHER PUBLICATIONS

Intel Corporation: "Feature Lead Summary for NR-V2X AI—7.2.4.1.4 Resource Allocation Mechanism", 3GPP Draft; R1-1903397, Feb. 26, 2019, XP051601072, total 17 pages.
Extended European Search Report issued in corresponding European Application No. 19958560.5, dated Oct. 21, 2022, pp. 1-10.
Intel Corporation, Feature Lead Summary for NR-V2X AI—7.2.4.1.4 Resource Allocation Mechanism. 3GPP TSG RAN WG1 Meeting #96, Athens, Greece, Feb. 25-Mar. 1, 2019, R1-1903623, 18 pages.
Intel Corporation, Feature Lead Summary for NR-V2X AI—7.2.4.1.4 Resource Allocation Mechanism. 3GPP TSG RAN WG1 Meeting #96, Athens, Greece, Feb. 25-Mar. 1, 2019, R1-1903397, 17 pages.
International Search Report issued in corresponding International Application No. PCT/CN2019/130992, dated Sep. 28, 2020, pp. 1-9.

* cited by examiner

RESOURCE SCHEDULING METHOD, APPARATUS, AND SYSTEM

CROSS-REFERENCE TO RELATED APPLICATIONS

This application is a continuation of International Application No. PCT/CN2019/130992, filed on Dec. 31, 2019, the disclosure of which is hereby incorporated by reference in its entirety.

TECHNICAL FIELD

The present invention relates to the field of wireless communication technologies, and in particular, to a resource scheduling method, an apparatus, and a system.

BACKGROUND

With continuous development of communication technologies, more attention is paid to direct communication between devices, and a new link sidelink used to support direct communication between devices is introduced. For example, a sidelink technology often needs to be applied to a device-to-device (Device-to-Device, D2D) application scenario and a vehicle-to-everything (Vehicle-To-Everything, V2X) application scenario. V2X is a technology for establishing communication between a high-speed device represented by a vehicle and anything outside the vehicle. As shown in FIG. 1, the V2X includes vehicle to vehicle (Vehicle to Vehicle, V2V) communication, vehicle to pedestrian (Vehicle to Pedestrian, V2P) communication, vehicle to infrastructure (Vehicle to Infrastructure, V2I) communication, and vehicle to network (Vehicle to Network, V2N) communication.

However, currently, an existing sidelink-based resource configuration manner is monotonous. Particularly, with development of a 5G NR technology in the 3GPP standard organization, a more enriched and complete sidelink-based resource scheduling manner is urgently needed.

SUMMARY

This application provides a resource scheduling method, an apparatus, and a system, to provide a resource scheduling manner based on sidelink transmission.

According to a first aspect, an embodiment of this application provides a resource scheduling method, including:

A scheduling terminal device determines a resource for a sending terminal device to perform sidelink (sidelink) transmission; and the scheduling terminal device sends a first message to the sending terminal device, where the first message is used to indicate the transmission resource, where the resource is specifically used to perform a part or all of the following: transmission of data information, transmission of control information, and transmission of feedback information.

According to this solution, in this embodiment of the present invention, during data transmission, a manner in which the scheduling terminal device determines, for the sending terminal device, the transmission resource for the data transmission is provided, and is an enriched and complete sidelink-based resource configuration manner.

In a possible implementation, the data transmission is performed by using the resource used to perform sidelink (sidelink) transmission; control is performed by using the resource used to perform sidelink (sidelink) transmission; or feedback is performed by using the resource used to perform sidelink (sidelink) transmission.

In a possible implementation, the scheduling terminal device receives a first resource configuration message sent by a network side device, where the first resource configuration message is used to indicate the transmission resource, and the transmission resource is selected by the network side device from a preconfigured resource pool; the scheduling terminal device determines the transmission resource from the preconfigured resource pool; or the scheduling terminal device determines, through monitoring, a reserved resource set in a candidate resource set, and excludes the reserved resource set from the candidate resource set, to obtain a remaining candidate resource set; and the scheduling terminal device determines the transmission resource from the remaining candidate resource set.

In a possible implementation, before that a scheduling terminal device determines a resource for a sending terminal device to perform sidelink transmission, the scheduling terminal device receives a resource request sent by the sending terminal device; or the scheduling terminal device determines that preset configuration time is satisfied, where the preset configuration time is time determined by the scheduling terminal device to configure the transmission resource for the sending terminal device.

In a possible implementation, the scheduling terminal device receives a first resource request sent by the sending terminal device, where the first resource request includes a buffer status report BSR.

In a possible implementation, that the scheduling terminal device receives a resource request sent by the sending terminal device includes: The scheduling terminal device receives a second resource request sent by the sending terminal device, where the second resource request does not include a buffer status report BSR. After that the scheduling terminal device receives a second resource request sent by the sending terminal device, the method further includes: The scheduling terminal device sends a second message to the sending terminal device, where the second message is used to indicate a reporting resource used by the sending terminal device to report a third message, and the third message includes the BSR, so that the sending terminal device sends the third message to the scheduling terminal device by using the reporting resource.

In a possible implementation, that a scheduling terminal device determines a transmission resource for a sending terminal device to perform sidelink transmission includes: The scheduling terminal device determines, based on the BSR, the transmission resource used by the sending terminal device to perform sidelink transmission, where the BSR includes a part or all of a buffer size of the sidelink data, an index of a receiving terminal device, and transmission priority information.

In a possible implementation, after that the scheduling terminal device sends a first message to the sending terminal device, the scheduling terminal device receives a fourth message sent by the sending terminal device, where the fourth message is received by the sending terminal device from the receiving terminal device, and the fourth message is used to indicate a result of decoding, by the receiving terminal device, data received from the sending device.

In a possible implementation, the fourth message is a sidelink hybrid automatic repeat request SL-HARQ message; and the SL-HARQ message includes an acknowledgment ACK or a negative NACK message, where the ACK is used to indicate that the decoding succeeds, and the NACK is used to indicate that the decoding fails.

In a possible implementation, a transmission resource used by the sending terminal device to send the fourth message to the scheduling terminal device is determined based on the first message.

In a possible implementation, after that the scheduling terminal device receives a fourth message sent by the sending terminal device, the method further includes: The scheduling terminal device sends the fourth message to the network side device.

In a possible implementation, the scheduling terminal device sends the first message and/or the second message to the sending terminal device by using higher layer signaling between sidelinks; the scheduling terminal device sends the first message and/or the second message to the sending terminal device by using a control channel or a control message between the sidelinks; the scheduling terminal device sends the first message and/or the second message to the sending terminal device by using a shared channel or a data message between the sidelinks; the scheduling terminal device sends the first message and/or the second message to the sending terminal device by using a new sidelink scheduling channel, where the new sidelink scheduling channel is a channel different from the control channel, the shared channel, and the higher layer signaling; or the scheduling terminal device sends the first message and/or the second message to the sending terminal device by using new sidelink scheduling information, where the new sidelink scheduling information is a message different from the control message, the data message, and the higher layer signaling.

In a possible implementation, the scheduling terminal device receives a part or all of the first resource request, the second resource request, the third message, and the fourth message from the sending terminal device by using the higher layer signaling between the sidelinks; the scheduling terminal device receives a part or all of the first resource request, the second resource request, the third message, and the fourth message from the sending terminal device by using the control channel or the control message between the sidelinks; the scheduling terminal device receives a part or all of the first resource request, the second resource request, the third message, and the fourth message from the sending terminal device by using the shared channel or the data message between the sidelinks; the scheduling terminal device receives a part or all of the first resource request, the second resource request, the third message, and the fourth message from the sending terminal device by using the new physical layer sidelink scheduling channel, where the new physical layer sidelink scheduling channel is a channel different from the control channel, the shared channel, and the higher layer signaling; or the scheduling terminal device receives a part or all of the first resource request, the second resource request, the third message, and the fourth message from the sending terminal device by using the new sidelink scheduling information, where the new sidelink scheduling information is a message different from the control message, the data message, and the higher layer signaling.

In a possible implementation, the scheduling terminal device determines at least one transmission resource used by the sending terminal device to perform sidelink transmission; or the scheduling terminal device determines a resource pool used by the sending terminal device to perform sidelink transmission, where the transmission resource includes a part or all of the following: at least one transmission resource used by the sending terminal device to initially transmit the sidelink data, and at least one transmission resource used by the sending terminal device to retransmit the sidelink data.

In a possible implementation, the first message further includes the transmission resource used by the sending terminal device to send the fourth message and/or information used to indicate a location at which the sending terminal device sends the fourth message.

According to a second aspect, an embodiment of this application further provides a resource scheduling method, including:

A sending terminal device receives a first message from a scheduling terminal device, where the first message is used to indicate a transmission resource used by the sending terminal device to perform sidelink transmission; and the sending terminal device performs a part or all of the following steps on a receiving terminal device by using the transmission resource: transmission of data information, transmission of control information, and transmission of feedback information.

According to this solution, in this embodiment of the present invention, during data transmission, a manner in which the scheduling terminal device determines, for the sending terminal device, the transmission resource for the data transmission is provided, and is an enriched and complete sidelink-based resource configuration manner.

In a possible implementation, before that a sending terminal device receives a first message from a scheduling terminal device, the sending terminal device sends a resource request to the scheduling terminal device.

In a possible implementation, after that the sending terminal device sends a resource request to the scheduling terminal device, after receiving a second message from the scheduling terminal device, the sending terminal device sends a third message to the scheduling terminal device, where the second message is used to indicate a reporting resource used by the sending terminal device to report the third message, and the third message includes a buffer status report BSR; and the buffer status report BSR includes a part or all messages of a buffer size of sidelink data, an index of the receiving terminal device, and transmission priority information.

In a possible implementation, after the sending terminal device sends the sidelink data to the receiving terminal device by using the scheduling resource, the sending terminal device receives a fourth message from the receiving terminal device, where the fourth message is a decoding result of decoding, by the receiving terminal device, the sidelink data sent by the sending terminal device; and the sending terminal device sends the fourth message to the scheduling terminal device.

In a possible implementation, the fourth message is a sidelink hybrid automatic repeat request SL-HARQ message; and the SL-HARQ message includes an acknowledgment ACK or a NACK, where the ACK is used to indicate that the decoding succeeds, and the NACK is used to indicate that the decoding fails.

In a possible implementation, after that a sending terminal device receives a first message from a scheduling terminal device, the method further includes: The sending terminal device sends, to the scheduling terminal device, the fourth message indicating that the decoding fails, so that after receiving the fourth message indicating that the decoding fails, the scheduling terminal re-determines and notifies, to the sending terminal device, a transmission resource used to perform sidelink transmission.

In a possible implementation, the sending terminal device receives, by using higher layer signaling between sidelinks, the first message and/or the second message sent by the scheduling terminal device; the sending terminal device receives, by using a control channel or a control message between the sidelinks, the first message and/or the second message sent by the scheduling terminal device; the sending terminal device receives, by using a shared channel or a data message between the sidelinks, the first message and/or the second message sent by the scheduling terminal device; the sending terminal device receives, by using a new sidelink scheduling channel, the first message and/or the second message sent by the scheduling terminal device, where the new sidelink scheduling channel is a channel different from the control channel, the shared channel, and the higher layer signaling; or the sending terminal device receives, by using new sidelink scheduling information, the first message and/or the second message sent by the scheduling terminal device, where the new sidelink scheduling information is a message different from the control message, the data message, and the higher layer signaling.

In a possible implementation, the sending terminal device sends a part or all of the first resource request, the second resource request, the third message, and/or the fourth message to the scheduling terminal device by using higher layer signaling between sidelinks; the sending terminal device sends a part or all of the first resource request, the second resource request, the third message, and the fourth message to the scheduling terminal device by using a control channel or a control message between the sidelinks; the sending terminal device sends a part or all of the first resource request, the second resource request, the third message, and the fourth message to the scheduling terminal device by using a shared channel or a data message between the sidelinks; the sending terminal device sends a part or all of the first resource request, the second resource request, the third message, and the fourth message to the scheduling terminal device by using a new sidelink scheduling channel, where the new physical layer sidelink scheduling channel is a channel different from the control channel, the shared channel, and the higher layer signaling; or the sending terminal device sends a part or all of the first resource request, the second resource request, the third message, and the fourth message to the scheduling terminal device by using new sidelink scheduling information, where the new sidelink scheduling information is a message different from the control message, the data message, and the higher layer signaling.

In a possible implementation, the first message further includes a transmission resource used by the sending terminal device to send the fourth message and/or information used to indicate a location at which the sending terminal device sends the fourth message.

According to a third aspect, an embodiment of this application provides a communication apparatus, and the communication apparatus has a function of implementing the terminal device in the foregoing embodiment. The function may be implemented by hardware, or may be implemented by hardware executing corresponding software. The hardware or software includes one or more units or modules corresponding to the foregoing function.

In a possible implementation, the communication apparatus may be a scheduling terminal device, or a component, for example, a chip, a chip system, or a circuit, that may be used for the scheduling terminal device. In this case, the communication apparatus may include a transceiver and a processor. The processor may be configured to support the communication apparatus in performing a corresponding function of the foregoing scheduling terminal device. The transceiver is configured to support the communication apparatus in communicating with another terminal device (for example, a sending terminal device), a network side device, and the like. Optionally, the communication apparatus may further include a memory. The memory may be coupled to the processor, and stores program instructions and data that are necessary for the communication apparatus. The transceiver may be an independent receiver, an independent transmitter, a transceiver integrated with a transceiver function, or an interface circuit.

In another possible implementation, the communication apparatus may be a sending terminal device, or a component, for example, a chip, a chip system, or a circuit, that may be used for the sending terminal device. In this case, the communication apparatus may include a transceiver and a processor. The processor may be configured to support the communication apparatus in performing a corresponding function of the foregoing sending terminal device. The transceiver is configured to support the communication apparatus in communicating with another terminal device (for example, a scheduling terminal device), a network side device, and the like. Optionally, the communication apparatus may further include a memory. The memory may be coupled to the processor, and stores program instructions and data that are necessary for the communication apparatus. The transceiver may be an independent receiver, an independent transmitter, a transceiver integrated with a transceiver function, or an interface circuit.

According to a fourth aspect, an embodiment of this application provides a communication system. The communication system includes a sending terminal device, a scheduling terminal device, and the like.

The scheduling terminal device may be configured to perform the method according to any one of the first aspect or the possible implementations of the first aspect.

The sending terminal device is configured to perform the method according to any one of the second aspect or the possible implementations of the second aspect.

According to a fifth aspect, an embodiment of this application provides a chip system. The chip system includes a processor, and optionally further includes a memory. The memory is configured to store a computer program. The processor is configured to invoke the computer program from the memory and run the computer program, to enable a communication device on which the chip system is installed to perform the method according to any one of the first aspect or the second aspect or the possible implementations of the first aspect or the second aspect.

According to a sixth aspect, an embodiment of this application provides a computer program product. The computer program product includes computer program code. When the computer program code is run by a communication unit, a processing unit, a transceiver, or a processor of a communication device, the communication device is enabled to perform the method according to any one of the first aspect or the second aspect or the possible implementations of the first aspect or the second aspect.

According to a seventh aspect, an embodiment of this application provides a computer-readable storage medium. The computer-readable storage medium stores a program, and the program enables a communication device (for example, a sending terminal device; for another example, a scheduling terminal device) to perform the method according to any one of the first aspect or the second aspect or the possible implementations of the first aspect or the second aspect.

DESCRIPTION OF EMBODIMENTS

The following illustrates this application in detail with reference to accompanying drawings of this specification.

Figure 1:
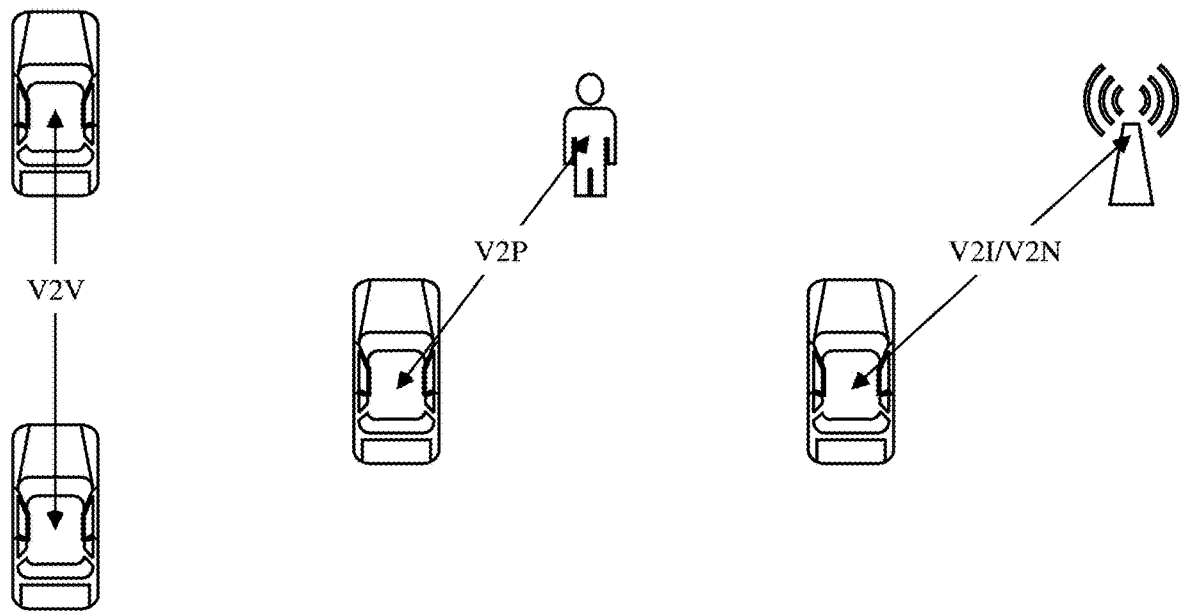
FIG. 1 is a schematic diagram of a scenario of vehicle-to-everything.

With continuous development of communication technologies, more attention is paid to direct communication between devices, and a new link sidelink used to support direct communication between devices is introduced. For example, a sidelink technology often needs to be applied to a device-to-device (Device-to-Device, D2D) application scenario and a vehicle-to-everything (Vehicle-To-Everything, V2X) application scenario. V2X is a technology for establishing communication between a high-speed device represented by a vehicle and anything outside the vehicle. As shown in FIG. 1, the V2X includes vehicle to vehicle (Vehicle to Vehicle, V2V) communication, vehicle to pedestrian (Vehicle to Pedestrian, V2P) communication, vehicle to infrastructure (Vehicle to Infrastructure, V2I) communication, and vehicle to network (Vehicle to Network, V2N) communication.

However, currently, an existing sidelink-based resource configuration manner is monotonous. Particularly, with development of a 5G NR technology in the 3GPP standard organization, a more enriched and complete sidelink-based resource configuration manner is urgently needed.

For example, there are two transmission modes related to sidelink resource allocation in existing NR-V2X. One is a mode in which a base station allocates a resource (mode 1), and the other is a mode in which a user selects a resource (mode 2). The mode 1 is mainly applied to V2X communication having network coverage, and the base station centrally performs resource allocation based on a BSR reporting status of a terminal device. The mode 2 mainly means that a transmission resource of a sending terminal device does not depend on a base station. Therefore, the mode 2 is not limited to network coverage. When there is no network coverage, the sending terminal device may also perform communication in this mode.

The mode 2 may be further classified into four sub-modes: a mode 2(a), a mode 2(b), a mode 2(c), and a mode 2(d).

Figure 2:
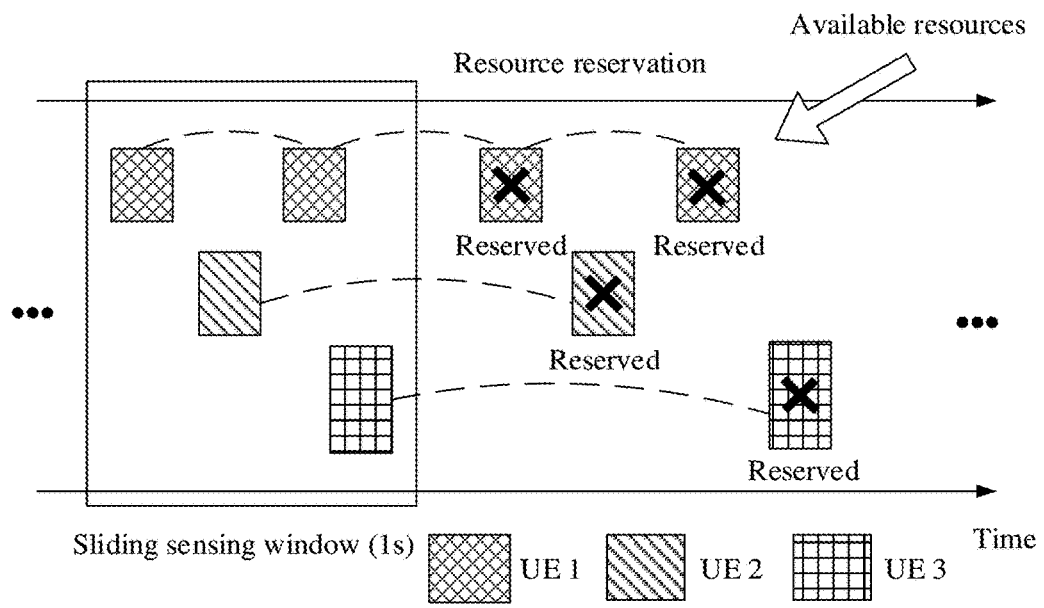
FIG. 2 is a schematic diagram of resource scheduling in an existing mode 2(a)

The mode 2(a) mainly means that a sending terminal device selects a transmission resource for communication. Specifically, as shown in FIG. 2, the sending terminal device selects the transmission resource based on a historical monitoring message, where the monitoring message includes a resource that has been reserved by another terminal device. After excluding the reserved resource from a resource pool, the sending terminal device selects the transmission resource from a remaining resource, and then sends sidelink data.

The mode 2(b) mainly means that a transmission resource of a sending terminal device is selected with assistance of another terminal device.

The mode 2(c) mainly means that a transmission resource of a sending terminal device is selected from a resource preconfigured by using higher layer signaling.

The mode 2(d) mainly means that a plurality of terminal devices first each perform a group establishment operation, where one terminal device in a group is a scheduling terminal device, and another terminal device is a sending terminal device. The scheduling terminal device is responsible for a transmission resource of the sending terminal device.

However, in the existing mode 2, for the sub-mode mode 2(d), only a definition is provided, but no specific procedure design is provided. In addition, in a scenario in which the mode 1 and the mode 2 coexist, how resource allocation is performed in the mode 2(d) in combination with the mode 1 or another mode 2 is not provided.

To resolve the foregoing problems, embodiments of this application provide a resource scheduling method. Technical solutions in embodiments of this application may be applied to various communication systems, for example, a long term evolution (long term evolution, LTE) system, a worldwide interoperability for microwave access (worldwide interoperability for microwave access, WiMAX) communication system, a future 5th generation (5th Generation, 5G) system such as a new radio access technology (new radio access technology, NR), and a future communication system such as a 6G system.

The 5G system (which may also be referred to as a new radio system) is used as an example Specifically, in embodiments of this application, for the problem of the unclear design of the existing mode 2(d) resource scheduling solution, a corresponding scheduling design is provided, to further improve an overall procedure and design of the mode 2(d).

Figure 3:
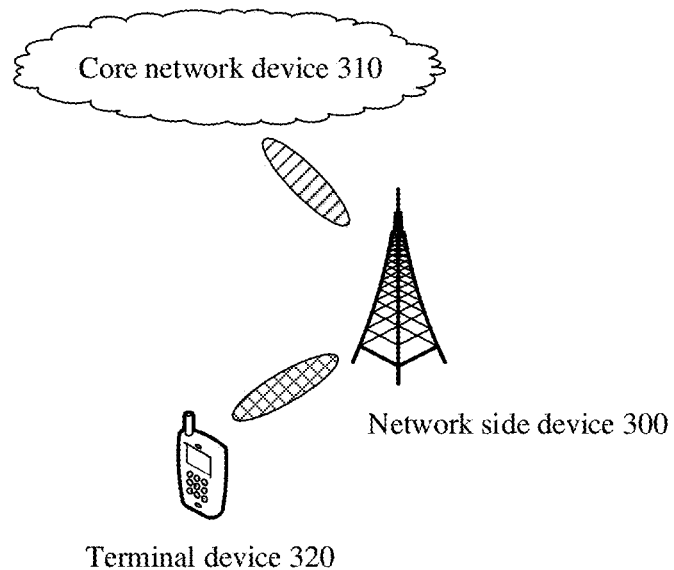
FIG. 3 is a schematic diagram of an architecture of a system according to an embodiment of this application.

For ease of understanding embodiments of this application, a communication system shown in FIG. 3 is first used as an example to describe in detail the communication system to which embodiments of this application are applicable. As shown in FIG. 3, the communication system includes a network side device 300, a core network device 310, and a terminal device 320. There may be a plurality of terminal devices 320, for example, including at least one scheduling terminal device and at least one sending terminal device.

The network side device 300 includes, for example, an access network (access network, AN) device and a radio access network (radio access network, RAN) device, where the access network device, for example, a base station (for example, an access point), may be a device, in an access network, that communicates with a wireless terminal device over an air interface through one or more cells. The base station may be configured to mutually convert a received over-the-air frame and an internet protocol (IP) packet, and serve as a router between the terminal device and a remaining part of the access network. The remaining part of the access network may include an IP network. The network side device may further coordinate attribute management of the air interface. For example, the network side device may include an evolved NodeB (NodeB, eNB, or e-NodeB, evolved NodeB) in a long term evolution (long term evolution, LTE) system or a long term evolution-advanced (long term evolution-advanced, LTE-A) system; or may include a next generation NodeB (next generation NodeB, gNB), a next generation evolved NodeB (next generation evolved NodeB, ng-eNB), or an enhanced next generation NodeB (enhanced next generation NodeB, en-gNB) in a 5th generation (5th generation, 5G) new radio (new radio, NR) system; or may include a centralized unit (centralized unit, CU) and a distributed unit (distributed unit, DU) in a cloud radio access network (cloud radio access network, Cloud RAN) system, or may further include a relay device. This is not limited in embodiments of this application.

The core network device 310 includes, for example, a network device that processes and forwards signaling and data of a user. In a 4G system, a core network device is, for example, a mobility management entity (mobility management entity, MME). The MME is a key control node of an access network of an LTE system defined in the 3rd generation partnership project (3rd generation partnership project, 3GPP) protocol. The MME is responsible for a positioning and paging process and the like of a terminal device in an idle mode, where relaying is included. Briefly, the MME is a core network device responsible for signaling processing. Alternatively, in a 5G system, the core network device includes, for example, a core network device such as an access management network element, a session management network element, or a user plane gateway. The user plane gateway may be a server that has functions such as mobility management, routing, and forwarding specific to user plane data. The user plane gateway, for example, a serving gateway (serving gateway, SGW), a packet data network gateway (packet data network gateway, PGW), or a user plane network element functional entity (user plane function, UPF) is generally located on a network side.

The terminal device 320 is a device that provides a voice and/or data connectivity for a user, and may also be referred to as user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The terminal in embodiments of this application may be a mobile phone (mobile phone), a pad (Pad), a computer with a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like.

A network architecture and a service scenario described in embodiments of this application are intended to describe the technical solutions in embodiments of this application more clearly, and do not constitute a limitation on the technical solutions provided in embodiments of this application. A person of ordinary skill in the art may learn that: With evolution of the network architecture and emergence of a new service scenario, the technical solutions provided in embodiments of this application are also applicable to similar technical problems. It should be understood that FIG. 3 is merely a simplified schematic diagram used as an example for ease of understanding. The communication system may further include another network side device or another terminal device that is not shown in FIG. 3.

Some terms in embodiments of this application are explained and described below for ease of understanding.

(1) "Resource scheduling" in embodiments of this application may refer to proper and effective adjustment, measurement, analysis, and use of various resources.

(2) In embodiments of this application, a "hybrid automatic repeat request (Hybrid Automatic Repeat reQuest, HARQ)" is a technology formed by combining forward error correction coding and an automatic repeat request.

For example, a transmit end sends data to a receive end. When a data packet arrives at the receive end, the receive end performs error detection on the data packet. If the data packet is received correctly, an acknowledgment (ACK) signal is returned. If the data packet is received incorrectly, a negative acknowledgment (NACK) signal is returned. When receiving the ACK signal, the transmit end transmits new data. Otherwise, the transmit end retransmits the previously transmitted data packet.

In embodiments of this application, a term "at least one" indicates one or more, and "a plurality of" indicates two or more. The term "and/or" describes an association relationship between associated objects and represents that three relationships may exist. For example, "A and/or B" may represent the following three cases: Only A exists, both A and B exist, and only B exists. A and B may be in a singular or plural form. The character "/" generally represents an "or" relationship between the associated objects. "At least one of the following" or a similar expression thereof indicates any combination of these items, including a single item or any combination of a plurality of items. For example, at least one of a, b, or c may indicate: a, b, c, a and b, a and c, b and c, or a, b, and c, where a, b, and c may be singular or plural.

Unless otherwise stated, ordinal numbers such as "first" and "second" mentioned in embodiments of this application are intended to distinguish a plurality of objects, rather than limit an order, a time sequence, priorities, or importance degrees of the plurality of objects.

In addition, the terms "include/comprise" and "have" in the embodiments, claims, and accompanying drawings of this application are not exclusive. For example, a process, a method, a system, a product, or a device including a series of steps or modules is not limited to the listed steps or modules, and may further include steps or modules that are not listed.

The mode 2(d) is defined as "a plurality of terminal devices first each perform a group establishment operation, where one terminal device in a group is a scheduling terminal device, and another terminal device is a sending terminal device. The scheduling terminal device is responsible for a transmission resource of the sending terminal device". Therefore, in embodiments of this application, when resource scheduling is performed in the mode 2(d), the network side device may determine a scheduling terminal device from a plurality of terminal devices that apply for being used as the scheduling terminal device, and determine a terminal device corresponding to another terminal device message included in an application message sent by the scheduling terminal device as a sending terminal device for which the scheduling terminal device is responsible for performing resource scheduling.

For example, in embodiments of this application, the scheduling terminal device determined by the network side device is a terminal device 1 (referred to as a scheduling terminal device 1 for short), and sending terminal devices for which the scheduling terminal device 1 is responsible for performing resource scheduling are terminal devices 2 to 10.

It should be noted that the foregoing manner of determining the scheduling terminal device and the method for determining the sending terminal device for which the scheduling terminal device is responsible for performing resource scheduling is not intended to limit the resource scheduling based on the mode 2(d) in embodiments of this application. Any manner of determining the scheduling terminal device and any method for determining the sending terminal device for which the scheduling terminal device is responsible for performing resource scheduling that are applicable to embodiments of this application shall fall within the protection scope of embodiments of this application.

Based on the descriptions of the foregoing application scenario and content such as determining the scheduling terminal device in embodiments of this application, the following specifically describes a resource scheduling procedure in the mode 2(d).

In embodiments of this application, when the resource scheduling is performed in the mode 2(d), the scheduling terminal device needs to determine, for the sending terminal device, a transmission resource used to perform sidelink transmission.

In an optional solution of embodiments of this application, the resource used to perform sidelink (sidelink) transmission is specifically used to perform a part or all of the following: transmitting data information by using the resource used to perform sidelink (sidelink) transmission, transmitting control information by using the resource used to perform sidelink (sidelink) transmission, and transmitting feedback information by using the resource used to perform sidelink (sidelink) transmission.

In embodiments of this application, the scheduling terminal device may determine, in a plurality of manners, the resource used to perform sidelink transmission. This is not specifically limited to the following manners. Determining manner 1: The scheduling terminal device receives a first resource configuration message sent by the network side device, where the first resource configuration message is used to indicate the transmission resource.

Further, in embodiments of this application, before receiving the transmission resource sent by the network side device, the scheduling terminal device sends, to the network side device, a request used for obtaining the transmission resource, so that after receiving the request that is used for obtaining the transmission resource and that is sent by the scheduling terminal device, the network side device determines the transmission resource, and sends the determined transmission resource to the scheduling terminal device.

The transmission resource is selected by the network side device from a preconfigured resource pool.

For example, the network side device determines a resource pool corresponding to the scheduling terminal device, and it is assumed that a terminal identifier of the scheduling terminal device is 1.

Optionally, the network side device may determine, based on a mapping relationship between a terminal Identifier of a scheduling terminal device and a resource pool, a resource pool corresponding to the scheduling terminal device 1. For example, assuming that the mapping relationship between a terminal Identifier of a scheduling terminal device and a resource pool is shown in the following Table 1, it can be learned from Table 1 that the resource pool corresponding to the scheduling terminal device 1 is a resource pool 1.

TABLE 1

Mapping relationship between a terminal identifier of a scheduling terminal device and a resource pool

| Identifier of a scheduling terminal device | Identifier of a resource pool |
| --- | --- |
| Identifier 1 | Resource pool 1 |
| Identifier 12 | Resource pool 2 |
| Identifier 26 | Resource pool 3 |

The resource pool is preconfigured by the network side device for the scheduling terminal device. For example, the network side device configures one resource pool for each scheduling terminal device, that is, each scheduling terminal device corresponds to one resource pool. It should be noted that in embodiments of this application, a resource pool may be in a one-to-one correspondence with a scheduling terminal device, or one resource pool may correspond to a plurality of scheduling terminal devices. This is not limited herein.

For another example, the network side device preconfigures one resource pool, and all scheduling terminal devices corresponding to the network side device share the resource pool. It should be noted that when the terminal devices corresponding to the network side device share one resource pool, the network side device does not need to determine a resource pool corresponding to the scheduling terminal device, but may directly determine, from the common resource pool, a scheduling resource used corresponding to a data transmission request.

Optionally, the network side device may determine, based on a mapping relationship between a terminal device group to which the scheduling terminal device belongs and a resource pool, a resource pool corresponding to the scheduling terminal device 1. For example, it is assumed that the mapping relationship between a terminal device group and a resource pool is shown in the following Table 2. It is assumed that a terminal device group corresponding to the scheduling terminal device 1 is a group 1. It can be learned from Table 2 that because the scheduling terminal device 1 is a terminal device in the group 1, a corresponding resource pool is a resource pool 1.

TABLE 2

Mapping relationship between a terminal device group and a resource pool

| Terminal device group | Identifier of a resource pool |
| --- | --- |
| Group 1 | Resource pool 1 |
| Group 2 | Resource pool 2 |
| Group 3 | Resource pool 3 |

The resource pool is preconfigured by the network side device for a terminal device of each group. For example, the network side device configures one resource pool for the terminal device of each group, that is, each terminal device group corresponds to one resource pool. It should be noted that in embodiments of this application, the resource pool may be in a one-to-one correspondence with the scheduling terminal device, or one resource pool may correspond to a plurality of scheduling terminal devices. This is not limited herein.

For another example, the network side device preconfigures one resource pool, and all terminal devices corresponding to the network side device share the resource pool. It should be noted that when the terminal devices corresponding to the network side device share one resource pool, the network side device does not need to determine a resource pool corresponding to the scheduling terminal device, but may directly determine, from the common resource pool, a scheduling resource used for a data transmission request.

Further, the network side device selects at least one transmission resource from the determined resource pool as the transmission resource for sidelink data.

The network side device may determine the selected at least one transmission resource based on a message such as a data packet size or a priority, that is reported by the sending terminal device. The transmission resource is used by the sending terminal device to perform sidelink (sidelink) transmission.

Further, the scheduling terminal device determines all transmission resources sent by the network side device as transmission resources of the resource request; or the scheduling terminal device determines a part of transmission resources sent by the network side device as a transmission resource of the resource request.

Determining manner 2: The scheduling terminal device determines at least one transmission resource from a preconfigured resource pool. The transmission resource is used by the sending terminal device to perform sidelink (sidelink) transmission.

For example, a scheduling terminal device 1 determines a corresponding resource pool. It is assumed that the resource pool preconfigured by the scheduling terminal device includes transmission resources 1 to 10, where transmission resources 4 to 10 have been used by the scheduling terminal device 1 to schedule another resource request and are in an occupied state, and currently idle transmission resources are transmission resources 1 to 3. Therefore, the scheduling terminal device 1 selects at least one transmission resource from the transmission resources 1 to 3 to execute the resource request.

The scheduling terminal device may select, based on a quality of service (Quality of Service, QoS) requirement such as a data packet size or a priority of sidelink data, the transmission resource used to execute the resource request.

Optionally, the preconfigured resource pool is preconfigured by the network side device and is notified to the scheduling terminal device; or the preconfigured resource pool is configured by the scheduling terminal device.

It should be noted that, in embodiments of this application, a manner in which the scheduling terminal device selects the transmission resource from the preconfigured resource pool is not limited to the foregoing method, and any transmission resource selection manner applicable to embodiments of this application falls within the protection scope of embodiments of this application. For example, the scheduling terminal device may randomly select at least one transmission resource from the transmission resources 1 to 3 to execute the resource request.

In embodiments of this application, there may be a plurality of cases in which the sending terminal device is triggered to perform data transmission based on the transmission resource. For example, the sending terminal device has a to-be-sent data packet. For another example, the sending terminal device receives activation signaling sent by the scheduling terminal device.

In addition, in embodiments of this application, if the sending terminal device receives deactivation signaling sent by the scheduling terminal device, the sending terminal device stops the data transmission on the transmission resource.

Determining manner 3: The scheduling terminal device determines a reserved resource set in a candidate resource set through monitoring, and excludes the reserved resource set from the candidate resource set, to obtain a remaining candidate resource set; and the scheduling terminal device determines the transmission resource from the remaining candidate resource set.

In embodiments of this application, the scheduling terminal device determines, according to the determining manner 3, content used for the data transmission. For details, refer to steps in FIG. 4.

S400. The scheduling terminal device monitors, in a resource monitoring window, sidelink control information (Sidelink Control Information, SCI) sent by another terminal device in a frequency domain resource pool.

S401. The scheduling terminal device determines, based on a monitored message, a transmission resource, in a corresponding candidate resource, that has been reserved by the another terminal device.

S402. The scheduling terminal device excludes, from the candidate resource within a threshold range, the transmission resource that has been reserved by the another sending terminal device.

If the scheduling terminal device monitors the SCI sent by the another terminal device in the frequency domain resource pool, and may determine, based on the monitored message, that the candidate resource includes the resource that has been reserved by the another terminal device, and the reserved resource is located in a resource selection window [n+T1, n+T2], the scheduling terminal device performs physical sidelink shared channel-reference signal received power (Physical Sidelink Shared Channel-Reference Signal Received Power, PSSCH-RSPR) measurement on the candidate resource corresponding to the reserved resource. If a measurement result is greater than a preset RSRP threshold [Th]_RSRP, the reserved resource is excluded from the resource selection window (namely, the candidate resource), to obtain a remaining candidate resource. The preset RSPR threshold [Th]_RSRP is a function of a priority corresponding to data indicated in the received SCI and a priority corresponding to to-be-sent data of the sending terminal device.

If a quantity of candidate resources in the resource selection window is less than X % of all monitored resources, the preset RSRP threshold [Th]_RSRP is increased by 3 dB, and step S401c is repeated.

S403. The scheduling terminal device 1 determines, from the remaining candidate scheduling resource, a resource used to perform sidelink transmission.

There may be one or more resources that are determined by the scheduling terminal device and that are used to perform sidelink transmission. The "more" indicates greater than or equal to two.

In embodiments of this application, the scheduling terminal device may further determine, in any one of the determining manner 1 to the determining manner 3, a resource for sending a fourth message. The fourth message is used to indicate a result of decoding, by a receiving terminal device, data received from the sending device. The fourth message is an SL-HARQ message, and the SL-HARQ message includes an ACK or a NACK. The ACK is used to indicate that the decoding succeeds, and the NACK is used to indicate that the decoding fails.

If the scheduling terminal device determines the transmission resource used to send the fourth message, the transmission resource used to send the fourth message and the resource used to perform sidelink transmission are sent to the sending terminal device by using the first message, so that the sending terminal device sends the sidelink data to the receiving terminal device by using the resource used to perform sidelink transmission, and sends the fourth message to the scheduling terminal device by using the transmission resource used to send the fourth message.

In embodiments of this application, before the scheduling terminal device determines, for the sending terminal device, the resource used to perform sidelink transmission, there may be a plurality of cases in which the scheduling terminal device is triggered to determine the transmission resource. This is not specifically limited to the following several cases.

Trigger case 1: In embodiments of this application, the sending terminal device sends the resource request to the scheduling terminal device, so that after receiving the request that is sent by the sending terminal device and that is used to obtain the transmission resource, the scheduling terminal device determines the transmission resource, and sends the determined transmission resource to the sending terminal device.

There may be a plurality of cases in which the sending terminal device sends the resource request to the scheduling terminal device. This is not specifically limited to the following several cases.

Figure 5:
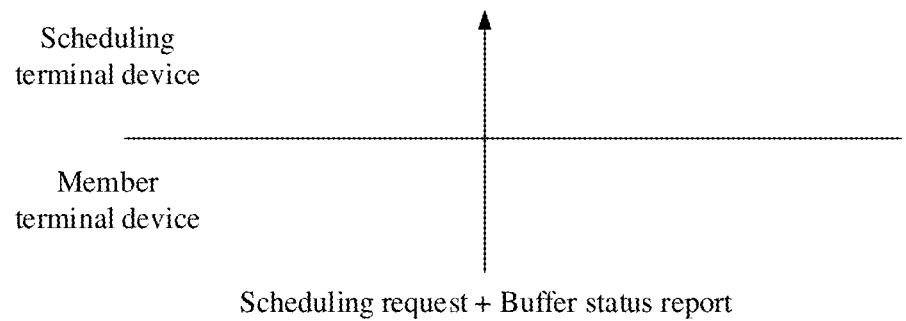
FIG. 5 is a schematic diagram of a transmission scheduling request according to an embodiment of this application.

Sending case 1: As shown in FIG. 5, the resource request sent by the sending terminal device to the scheduling terminal device is a first resource request.

In embodiments of this application, the first resource request includes a buffer status report (Buffer Status Report, BSR) corresponding to the resource request. In this case, the BSR is used to request the scheduling terminal device to configure the transmission resource for the sending terminal device, or the first resource request indicates the scheduling terminal device to configure the transmission resource for the sending terminal device.

Figure 6:
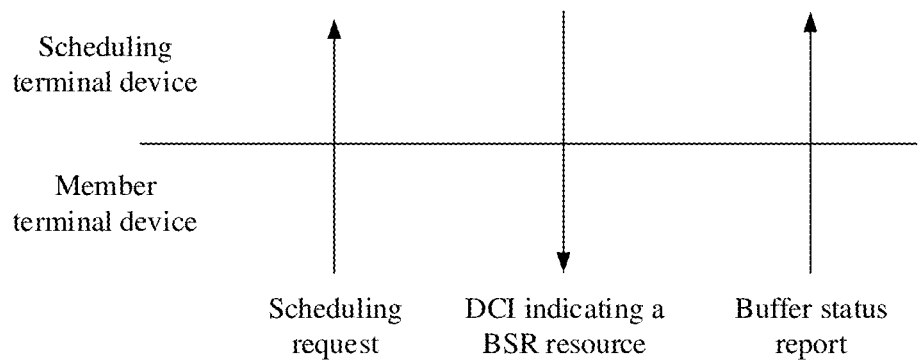
FIG. 6 is a schematic diagram of another transmission scheduling request according to an embodiment of this application.

Sending case 2: As shown in FIG. 6, the resource request sent by the sending terminal device to the scheduling terminal device is a second resource request.

The second resource request does not include the BSR. Therefore, the scheduling terminal device further needs to obtain the BSR. Specific steps may be shown in FIG. 7.

S700. After receiving second resource request signaling, the scheduling terminal device sends a second message to the sending terminal device, where the second message is used to indicate a reporting resource used by the sending terminal device to report the BSR.

Optionally, the scheduling terminal device may send the second message to the sending terminal device by using higher layer signaling between sidelinks;

the scheduling terminal device may send the second message to the sending terminal device by using a shared channel or a data message between the sidelinks;

the scheduling terminal device may send the second message to the sending terminal device by using a control channel or a control message between the sidelinks;

the scheduling terminal device may send the second message to the sending terminal device by using a new sidelink scheduling channel, where the new sidelink scheduling channel is a channel different from the control channel, the shared channel, and the higher layer signaling; or the scheduling terminal device may send the second message to the sending terminal device by using new sidelink scheduling information, where the new sidelink scheduling information is a message different from the control message, the data message, and the higher layer signaling.

S701. The sending terminal device receives the second message, and sends the BSR to the scheduling terminal device by using the reporting resource indicated in the second message.

S702. The scheduling terminal device receives the BSR sent by the sending terminal device.

Further, the BSR includes a part or all of messages of a buffer size of the sidelink data, an index of the receiving terminal device, and transmission priority information. The index of the receiving terminal device is used to distinguish between receiving terminal devices.

Optionally, the sending terminal device may send the resource request to the scheduling terminal device by using the higher layer signaling between the sidelinks;

the sending terminal device may send the resource request to the scheduling terminal device by using the shared channel or the data message between the sidelinks;

the sending terminal device may send the resource request to the scheduling terminal device by using the control channel or the control message between the sidelinks;

the sending terminal device may send the resource request to the scheduling terminal device by using the new sidelink scheduling channel, where the new sidelink scheduling channel is the channel different from the control channel, the shared channel, and the higher layer signaling; or the sending terminal device may send the resource request to the scheduling terminal device by using the new sidelink scheduling information, where the new sidelink scheduling information is the message different from the control message, the data message, and the higher layer signaling.

For example, to better understand the method in embodiments of this application, in embodiments of this application, several scheduling cases are selected and separately described based on content of the trigger case 1 with reference to the foregoing three determining manners. The scheduling cases are not specifically limited to the following several cases.

Figure 8:
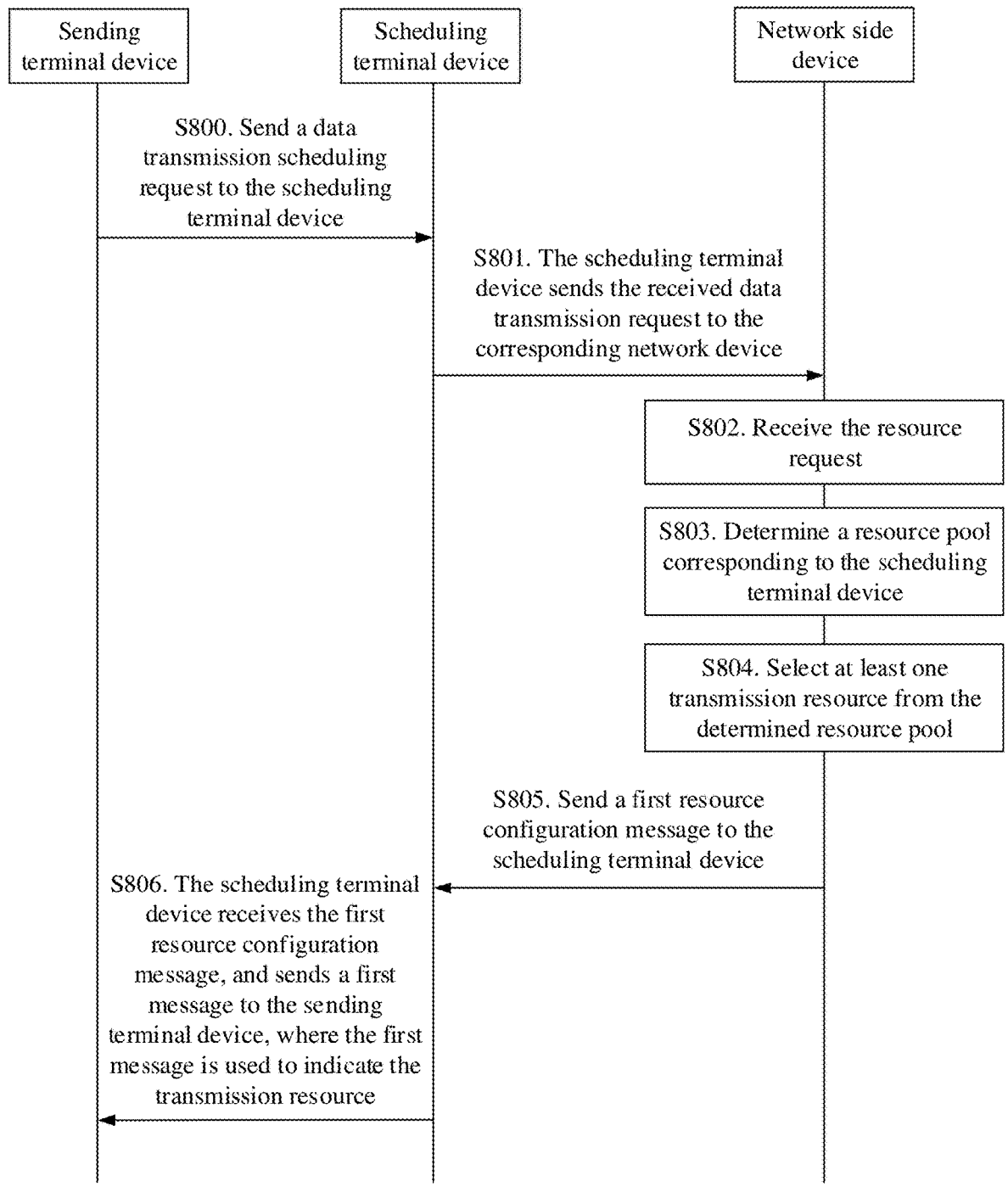
FIG. 8 is a schematic diagram of a first procedure in which resource scheduling is performed with reference to a determining manner 1 according to an embodiment of this application.

With reference to the determining manner 1: Assuming that a scheduling scenario is that a scheduling terminal device supports a mode 1 and a mode 2, as shown in FIG. 8, resource scheduling in this application includes the following steps.

S800. A sending terminal device sends a resource request to the scheduling terminal device.

S801. The scheduling terminal device sends the received resource request to a corresponding network side device.

S802. The network side device receives the resource request.

S803. The network side device determines a resource pool corresponding to the scheduling terminal device.

S804. The network side device selects at least one transmission resource from the determined resource pool.

S805. The network side device sends a first resource configuration message to the scheduling terminal device.

The first resource configuration message is used to indicate the at least one transmission resource selected by the network side device in S804.

Optionally, the network side device may send the first resource configuration message to the scheduling terminal device by using a downlink control channel PDCCH, or the network side device may send the first resource configuration message to the scheduling terminal device by using RRC higher layer signaling.

S806. The scheduling terminal device receives the first resource configuration message, and sends a first message to the sending terminal device, where the first message is used to indicate the transmission resource.

Optionally, in embodiments of this application, the scheduling terminal device may send the first resource configuration message to the sending terminal device as the first message.

Alternatively, in embodiments of this application, the scheduling terminal device determines, based on the received first resource configuration message, the at least one transmission resource selected by the network side device for the sending terminal device, and then sends, to the sending terminal device, the first message that carries the at least one transmission resource.

Optionally, the scheduling terminal device may send the first message to the sending terminal device by using higher layer signaling between sidelinks; the scheduling terminal device may send the first message to the sending terminal device by using a shared channel or a data message between the sidelinks; the scheduling terminal device may send the first message to the sending terminal device by using a control channel or a control message between the sidelinks; the scheduling terminal device may send the first message to the sending terminal device by using a new sidelink scheduling channel, where the new sidelink scheduling channel is a channel different from the control channel, the shared channel, and the higher layer signaling; or the scheduling terminal device may send the first message to the sending terminal device by using new sidelink scheduling information, where the new sidelink scheduling information is a message different from the control message, the data message, and the higher layer signaling.

According to the foregoing method, in embodiments of this application, when the mode 1 and the mode 2 are supported, a scheduling procedure based on single transmission or blind retransmission requested by the sending terminal device and a bearer relationship of related signaling are provided, to clarify a relationship and functions of the sending terminal device, the scheduling terminal device, and a base station in the scheduling procedure, and to further improve an overall procedure and a design of the mode 2(d).

Figure 9:
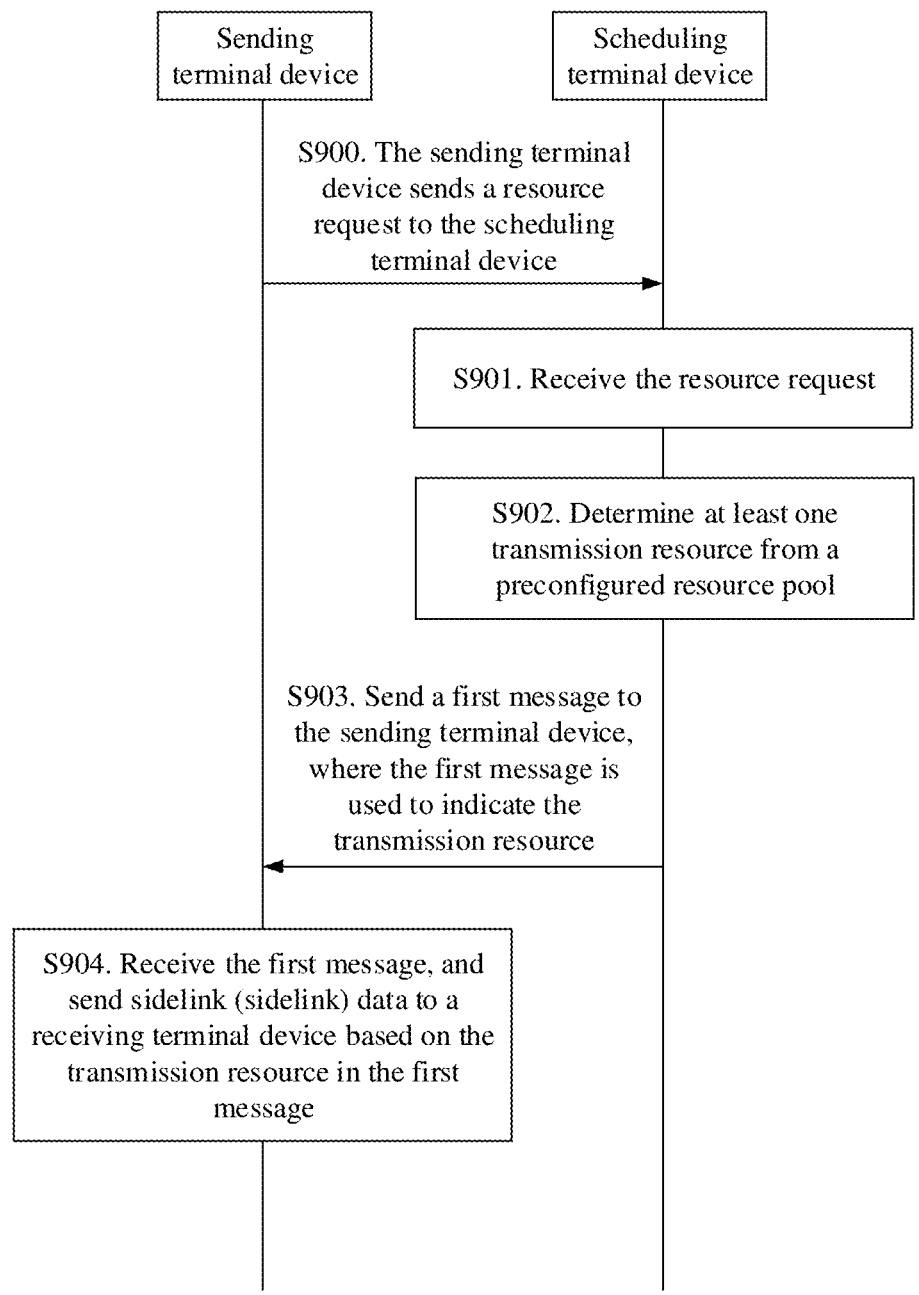
FIG. 9 is a schematic diagram of a second procedure in which resource scheduling is performed with reference to a determining manner 1 according to an embodiment of this application.

With reference to the determining manner 2: Assuming that a scheduling scenario is that a scheduling terminal device supports only a mode 2(d), as shown in FIG. 9, resource scheduling in this application includes the following steps.

S900. A sending terminal device sends a resource request to the scheduling terminal device.

S901. The scheduling terminal device receives the resource request.

S902. The scheduling terminal device determines at least one transmission resource from a preconfigured resource pool.

S903. The scheduling terminal device sends a first message to the sending terminal device, where the first message is used to indicate the transmission resource.

S904. The sending terminal device receives the first message, and sends sidelink data to a receiving terminal device based on the transmission resource in the first message.

According to the foregoing method, when only the mode 2(d) is supported, in embodiments of this application, a scheduling procedure based on single transmission or blind retransmission requested by the sending terminal device and a bearer relationship of related signaling are provided, to clarify a relationship and functions of the sending terminal device, the scheduling terminal device, and a base station in the scheduling procedure, and to further improve an overall procedure and a design of the mode 2(d).

Figure 10:
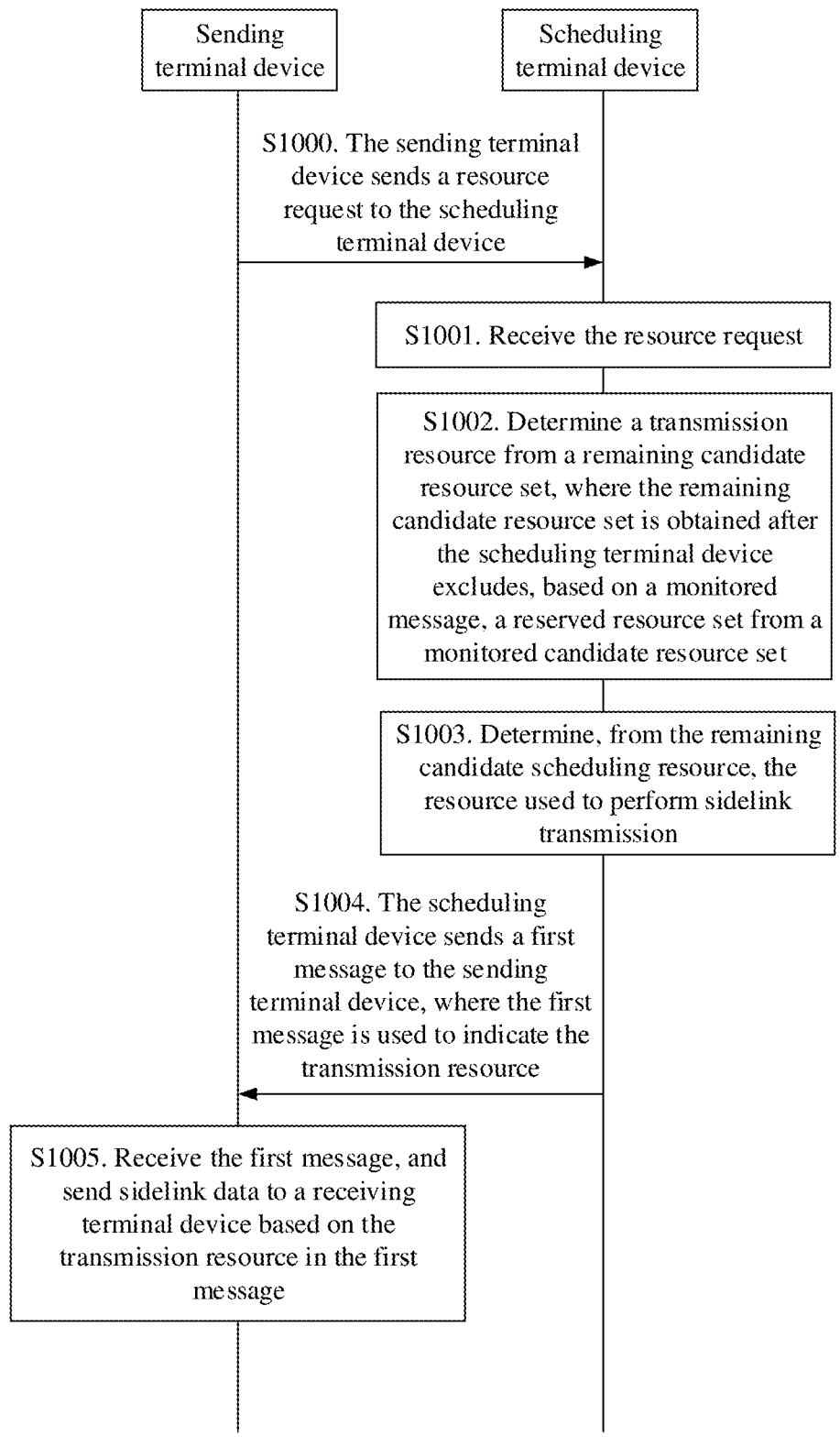
FIG. 10 is a schematic diagram of a third procedure in which resource scheduling is performed with reference to a determining manner 1 according to an embodiment of this application.

With reference to the determining manner 3: Assuming that a scheduling scenario is that a scheduling terminal device supports a mode 2(a) and a mode 2(d), as shown in FIG. 10, resource scheduling in this application includes the following steps.

S1000. A sending terminal device sends a resource request to the scheduling terminal device.

S1001. The scheduling terminal device receives the resource request.

S1002. The scheduling terminal device determines a transmission resource from a remaining candidate resource set, where the remaining candidate resource set is obtained after the scheduling terminal device excludes, based on a monitored message, a reserved resource set from a monitored candidate resource set.

S1003. The scheduling terminal device determines, from the remaining candidate scheduling resource, the resource used to perform sidelink transmission.

There may be one or more resources that are determined by the scheduling terminal device and that are used to perform sidelink transmission. The "more" indicates greater than or equal to two.

S1004. The scheduling terminal device sends a first message to the sending terminal device, where the first message is used to indicate the transmission resource.

S1005. The sending terminal device receives the first message, and sends sidelink data to a receiving terminal device based on the transmission resource in the first message.

According to the foregoing method, in embodiments of this application, when the mode 2(a) and the mode 2(d) are supported, a scheduling procedure based on single transmission or blind retransmission requested by the sending terminal device and a bearer relationship of related signaling are provided, to clarify a relationship and functions of the sending terminal device, the scheduling terminal device, and a base station in the scheduling procedure, and to further improve an overall procedure and a design of the mode 2(d).

Trigger case 2: In embodiments of this application, the scheduling terminal device determines that preset configuration time is satisfied, where the preset configuration time is time determined by the scheduling terminal device to configure the transmission resource for the sending terminal device.

For example, to better understand the method in embodiments of this application, embodiments of this application provide descriptions based on content of the trigger case 2 with reference to content of the determining manner 2.

Figure 11:
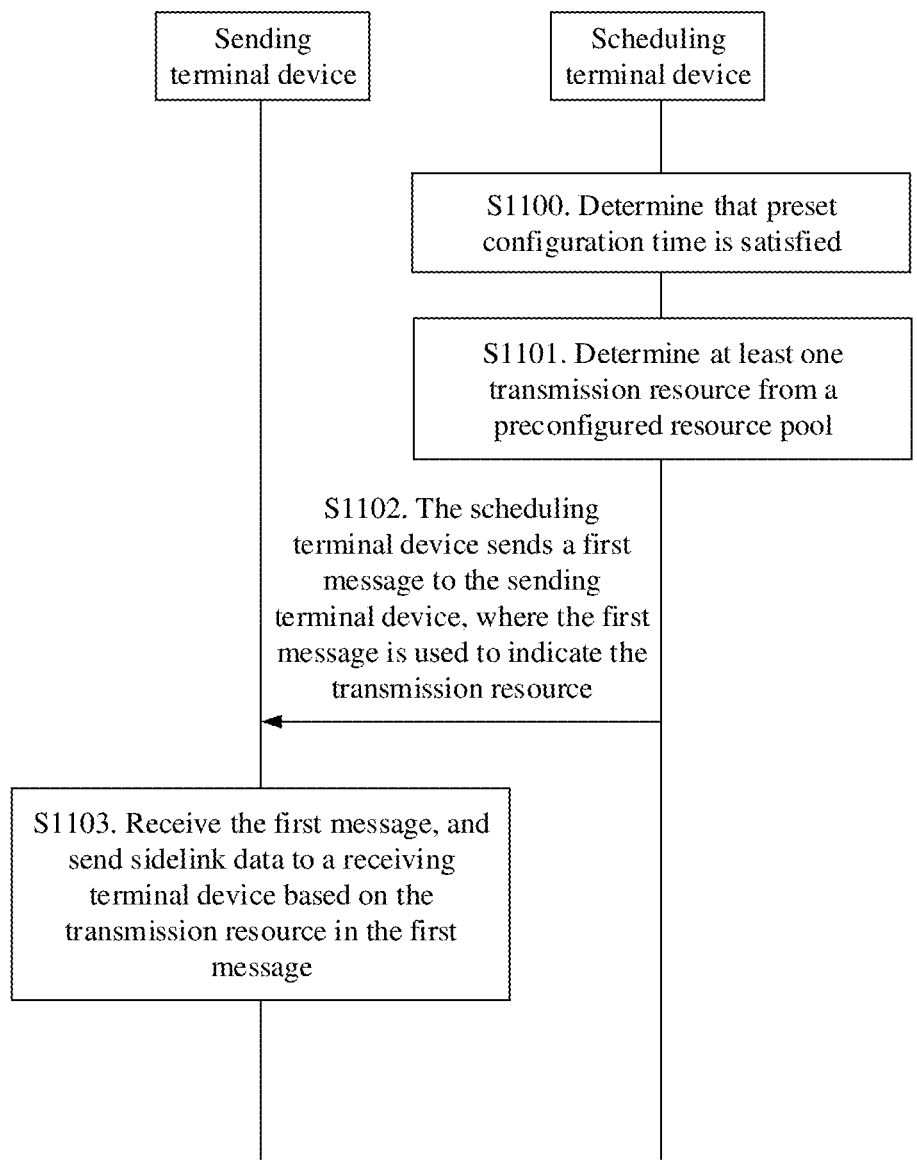
FIG. 11 is a schematic diagram of a procedure in which resource scheduling is performed with reference to a determining manner 2 according to an embodiment of this application.

With reference to the determining manner 2: Assuming that a scheduling scenario is that a scheduling terminal device supports only a mode 2(d), as shown in FIG. 11, resource scheduling in this application includes the following steps.

S1100. The scheduling terminal device determines that preset configuration time is satisfied.

S1101. The scheduling terminal device determines at least one transmission resource from a preconfigured resource pool.

S1102. The scheduling terminal device sends a first message to a sending terminal device, where the first message is used to indicate the transmission resource.

S1103. The sending terminal device receives the first message, and sends sidelink data to a receiving terminal device based on the transmission resource in the first message.

According to the foregoing method, in embodiments of this application, when only the mode 2(d) is supported, a scheduling procedure based on single transmission or blind retransmission requested by the sending terminal device and a bearer relationship of related signaling are provided, to clarify a relationship and functions of the sending terminal device, the scheduling terminal device, and a base station in the scheduling procedure, and to further improve an overall procedure and a design of the mode 2(d).

For content of the resource scheduling in the trigger case 2 with reference to another determining manner in embodiments of this application, refer to content in FIG. 8 to FIG. 11. Details are not described herein again.

Trigger case 3: In embodiments of this application, before the scheduling terminal device 1 receives the transmission resource sent by the network side device, the scheduling terminal device does not need to send, to the network side device, the request for obtaining the transmission resource. To be specific, the network side device actively determines the transmission resource, and sends the determined transmission resource to the scheduling terminal device.

For example, to better understand the method in embodiments of this application, embodiments of this application provide descriptions based on content of the trigger case 3 with reference to content of the determining manner 3.

Figure 12:
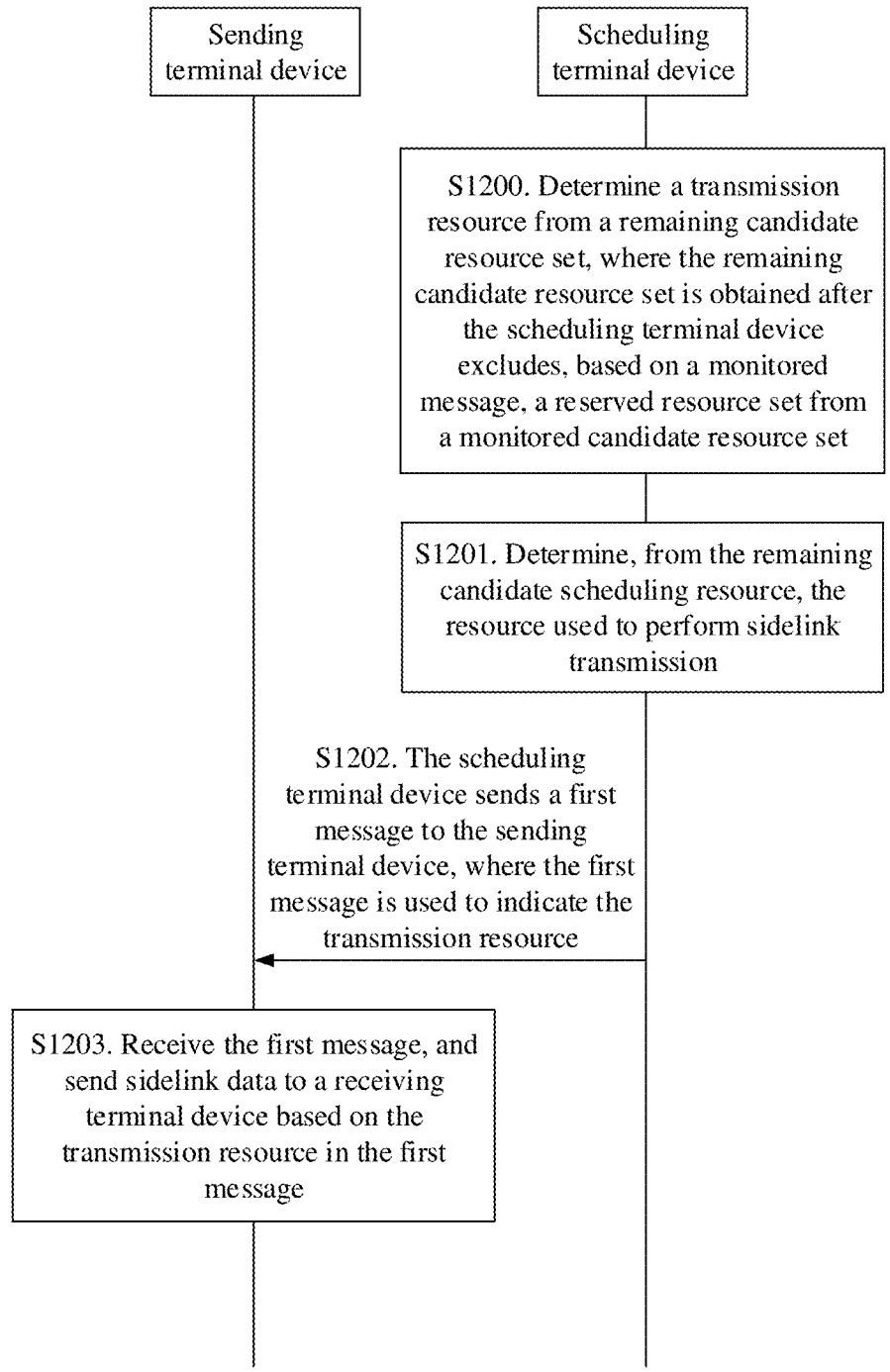
FIG. 12 is a schematic diagram of a procedure in which resource scheduling is performed with reference to a determining manner 3 according to an embodiment of this application.

With reference to the determining manner 3: Assuming that a scheduling scenario is that a scheduling terminal device supports a mode 2(a) and a mode 2(d), as shown in FIG. 12, resource scheduling in this application includes the following steps.

S1200. The scheduling terminal device determines a transmission resource from a remaining candidate resource set, where the remaining candidate resource set is obtained after the scheduling terminal device excludes, based on a monitored message, a reserved resource set from a monitored candidate resource set.

S1201. The scheduling terminal device determines, from the remaining candidate scheduling resource, the resource used to perform sidelink transmission.

There may be one or more resources that are determined by the scheduling terminal device and that are used to perform sidelink transmission. The "more" indicates greater than or equal to two.

S1202. The scheduling terminal device sends a first message to the sending terminal device, where the first message is used to indicate the transmission resource.

S1203. The sending terminal device receives the first message, and sends sidelink data to a receiving terminal device based on the transmission resource in the first message.

According to the foregoing method, in embodiments of this application, when the mode 2(a) and the mode 2(d) are supported, a scheduling procedure based on single transmission or blind retransmission requested by the sending terminal device and a bearer relationship of related signaling are provided, to clarify a relationship and functions of the sending terminal device, the scheduling terminal device, and a base station in the scheduling procedure, and to further improve an overall procedure and a design of the mode 2(d).

For content of the resource scheduling in the trigger case 3 with reference to another determining manner in embodiments of this application, refer to content in FIG. 8 to FIG. 12. Details are not described herein again.

Further, in embodiments of this application, after the scheduling terminal device sends the first message to the sending terminal device, the scheduling terminal device receives the fourth message sent by the sending terminal device. The fourth message is received by the sending terminal device from the receiving terminal device, and the fourth message is used to indicate the result of decoding, by the receiving terminal device, the data received from the sending device. Optionally, the fourth message is a sidelink-hybrid automatic repeat request (Sidelink-Hybrid Automatic Repeat request, SL-HARQ) message, and the SL-HARQ message includes an acknowledgment ACK or a negative acknowledgement NACK, where the ACK is used to indicate that the decoding succeeds, and the NACK is used to indicate that the decoding fails.

Further, the decoding result may be represented by a value of a bit. For example, a bit 1 represents the ACK, that is, the decoding succeeds; and a bit 0 represents the NACK, that is, the decoding fails.

Optionally, the receiving terminal device may send the fourth message to the sending terminal device by using the higher layer signaling between the sidelinks; the receiving terminal device may send the fourth message to the sending terminal device by using the shared channel or the data message between the sidelinks; the receiving terminal device may send the fourth message to the sending terminal device by using the control channel or the control message between the sidelinks; the receiving terminal device may send the fourth message to the sending terminal device by using the new sidelink scheduling channel, where the new sidelink scheduling channel is the channel different from the control channel, the shared channel, and the higher layer signaling; or the receiving terminal device may send the fourth message to the sending terminal device by using the new sidelink scheduling information, where the new sidelink scheduling information is the message different from the control message, the data message, and the higher layer signaling.

Further, if the scheduling terminal receives the fourth message indicating that the decoding fails, the scheduling terminal device re-determines and notifies, to the sending terminal device, a resource used to perform sidelink transmission.

For example, to better understand the method in embodiments of this application, based on a HARQ retransmission scenario and depending on whether the scheduling terminal device supports a mode other than the mode 2(d), several scheduling cases are selected and separately described in this application. The scheduling cases are not specifically limited to the following several cases.

Figure 13A:
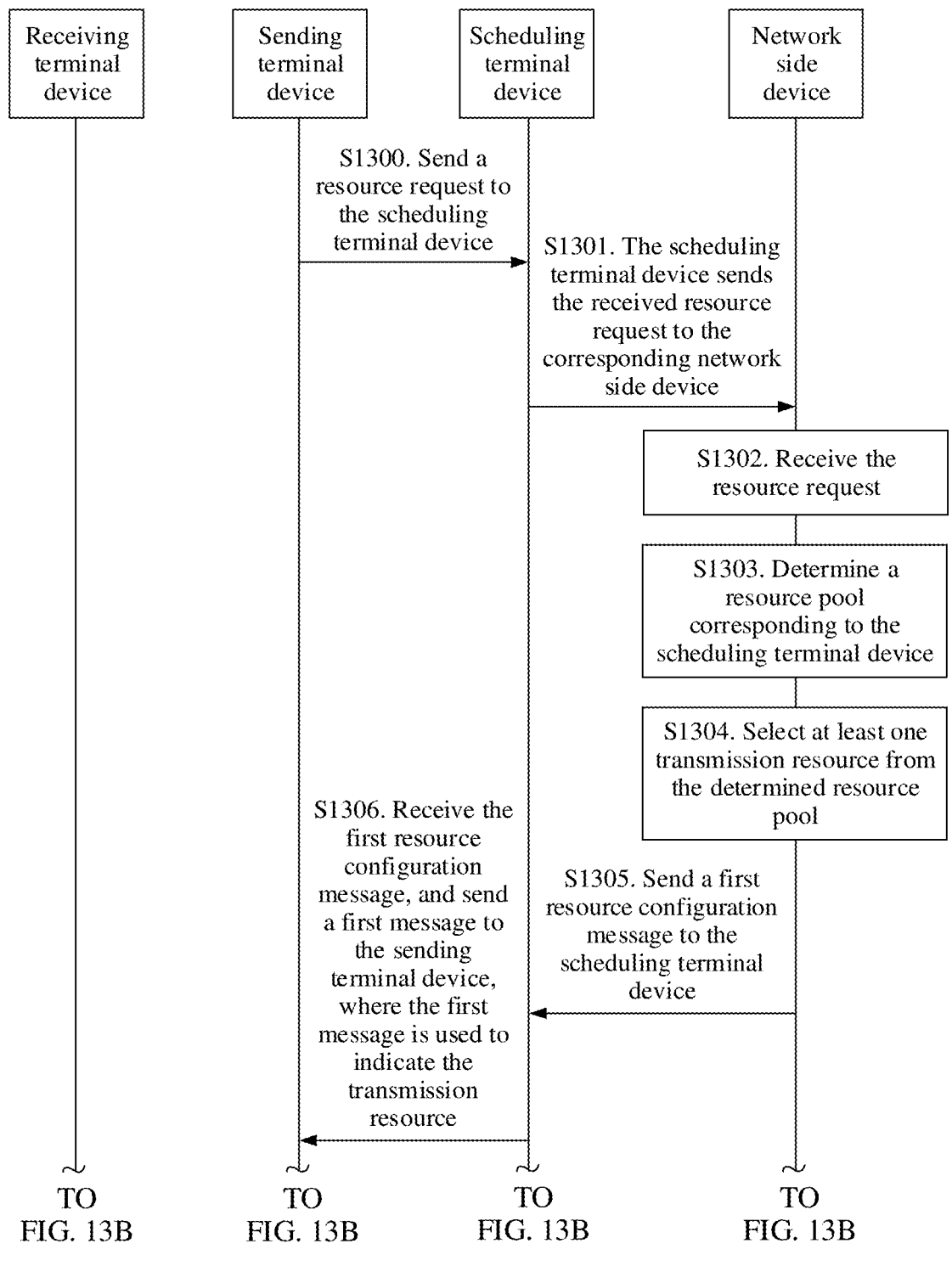
FIG. 13A and FIG. 13B are a schematic diagram of a first scheduling procedure in a HARQ retransmission scenario according to an embodiment of this application.
Figure 13B:
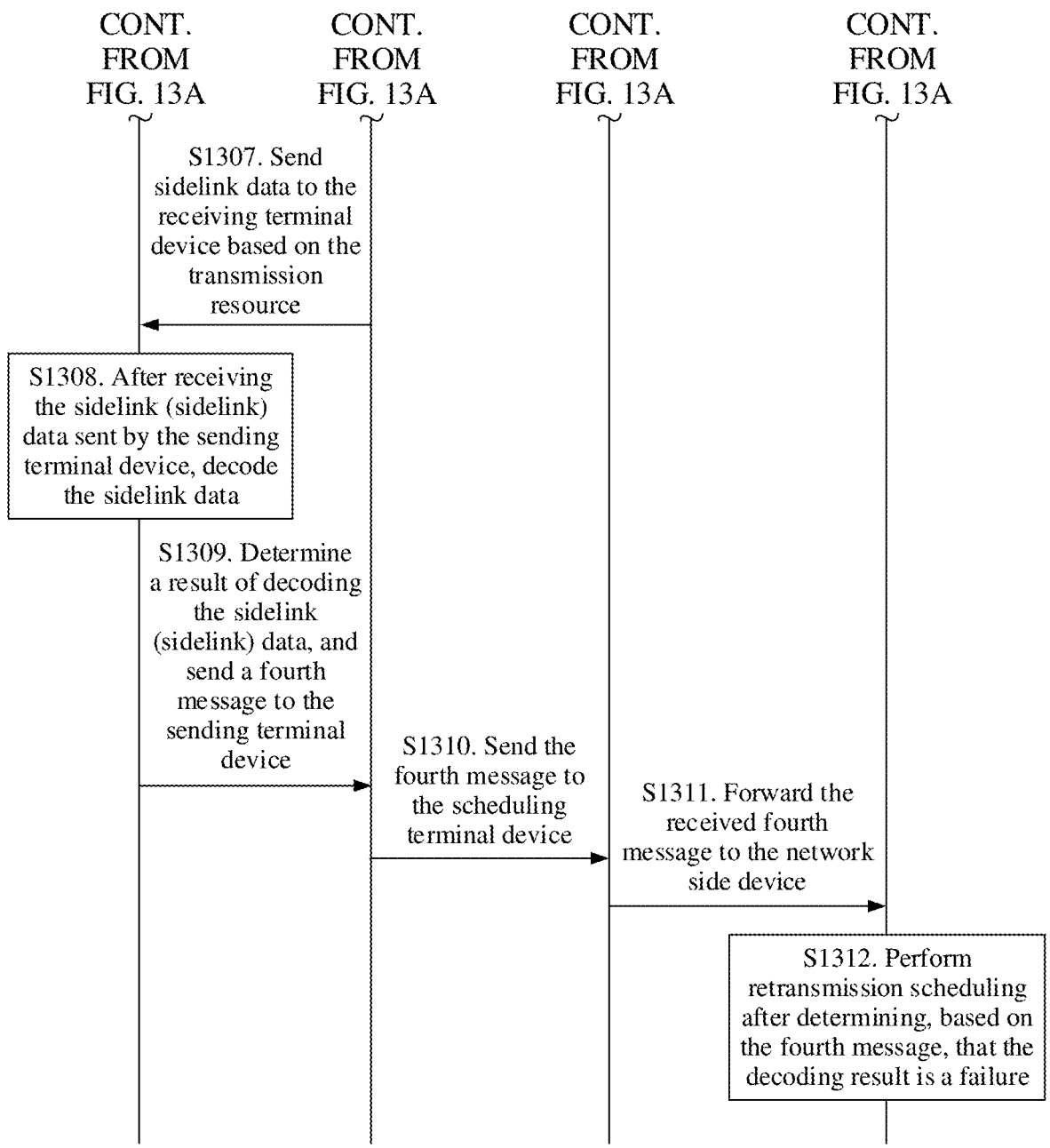

Scheduling case 1: The scheduling terminal device supports the mode 1 and the mode 2. As shown in FIG. 13A and FIG. 13B, resource scheduling in this application includes the following steps.

S1300. A sending terminal device sends a resource request to a scheduling terminal device.

S1301. The scheduling terminal device sends the received resource request to a corresponding network side device.

S1302. The network side device receives the resource request.

S1303. The network side device determines a resource pool corresponding to the scheduling terminal device.

S1304. The network side device selects at least one transmission resource from the determined resource pool.

S1305. The network side device sends a first resource configuration message to the scheduling terminal device.

The first resource configuration message is used to indicate the at least one transmission resource selected by the network side device in S1104.

S1306. The scheduling terminal device receives the first resource configuration message, and sends a first message to the sending terminal device, where the first message is used to indicate the transmission resource.

S1307. The sending terminal device sends sidelink data to a receiving terminal device based on the transmission resource.

S1308. After receiving the sidelink data sent by the sending terminal device, the receiving terminal device decodes the sidelink data.

S1309. The receiving terminal device determines a result of decoding the sidelink data, and sends a fourth message to the sending terminal device.

The fourth message is used to indicate the result of decoding, by the receiving terminal device, the data received from the sending device.

Optionally, the fourth message is an SL-HARQ message, and the SL-HARQ message includes an ACK or a NACK. The ACK is used to indicate that the decoding succeeds, and the NACK is used to indicate that the decoding fails.

S1310. The sending terminal device sends the fourth message to the scheduling terminal device.

Optionally, the sending terminal device may send the fourth message to the scheduling terminal device by using higher layer signaling between sidelinks; the sending terminal device may send the fourth message to the scheduling terminal device by using a shared channel or a data message between the sidelinks; the sending terminal device may send the fourth message to the scheduling terminal device by using a control channel or a control message between the sidelinks; the sending terminal device may send the fourth message to the scheduling terminal device by using a new sidelink scheduling channel, where the new sidelink scheduling channel is a channel different from the control channel, the shared channel, and the higher layer signaling; or the sending terminal device may send the fourth message to the scheduling terminal device by using new sidelink scheduling information, where the new sidelink scheduling information is a message different from the control message, the data message, and the higher layer signaling.

S1311. The scheduling terminal device forwards the received fourth message to the network side device.

Optionally, the scheduling terminal device may send the fourth message to the network side device by using an uplink control channel.

S1312. The network side device performs retransmission scheduling after determining, based on the fourth message, that the decoding result is a failure.

Optionally, when the decoding result is the failure, S1304 continues to be performed until the scheduling terminal device receives the fourth message indicating that the decoding succeeds.

Optionally, when the decoding result is the failure, S1304 continues to be performed. If the fourth message indicating that the decoding succeeds is still not received after S1304 is repeatedly performed N times, the operation ends. N may be a maximum quantity of retransmission times.

If the result of the decoding is a success, it is determined that the current data transmission is completed, and scheduling of the current data transmission request is ended.

According to the foregoing method, in embodiments of this application, when the mode 1 and the mode 2 coexist, a retransmission scheduling procedure based on a HARQ feedback requested by the sending terminal device and a bearer relationship of related signaling are provided, to clarify a relationship and functions of the sending terminal device, the scheduling terminal device, and the network side device in the scheduling procedure, and to further improve an overall procedure and a design of the mode 2(d).

Figure 14:
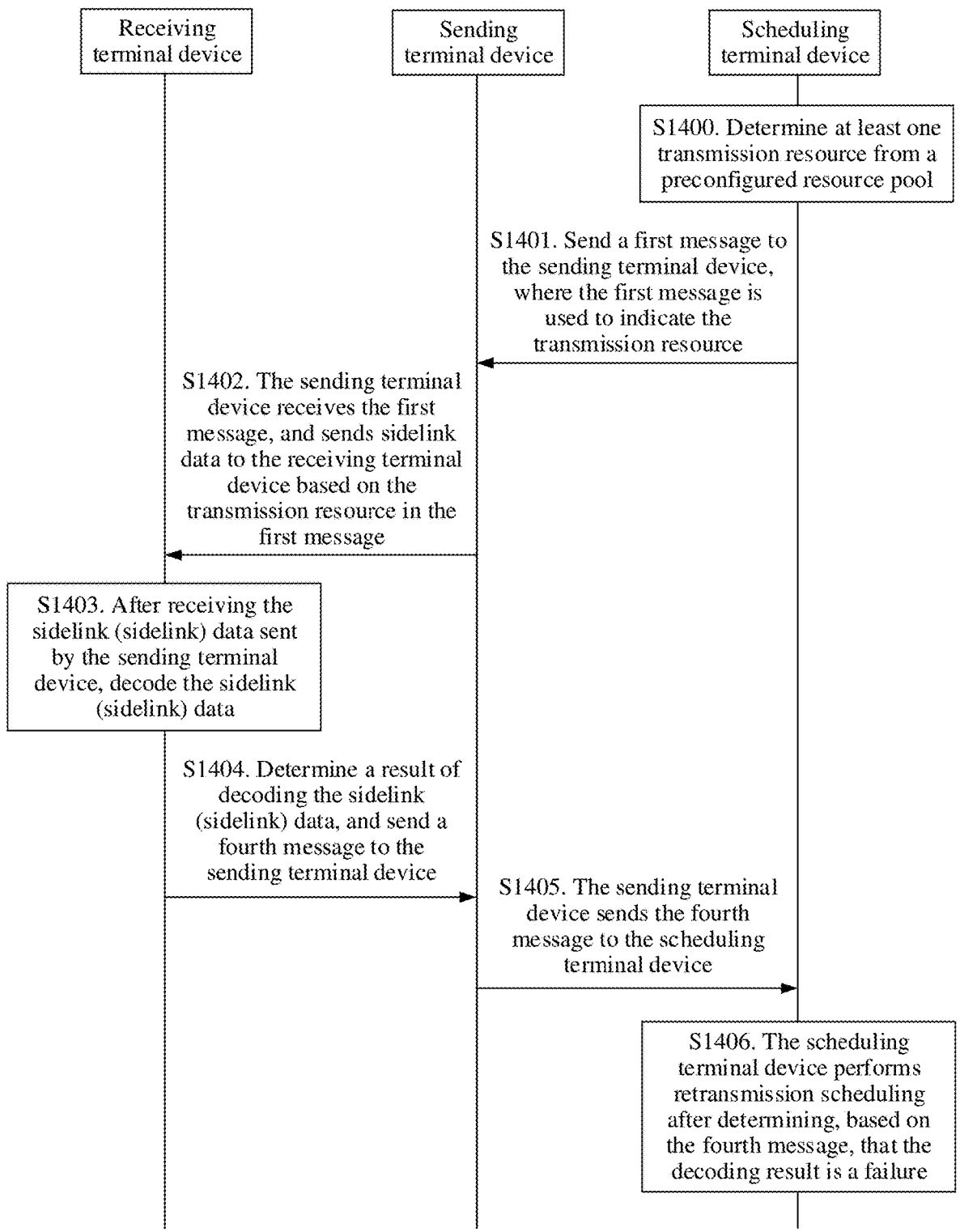
FIG. 14 is a schematic diagram of a second scheduling procedure in a HARQ retransmission scenario according to an embodiment of this application.

Scheduling case 2: The scheduling terminal device supports only the mode 2(d). As shown in FIG. 14, resource scheduling in this application includes the following steps.

S1400. A scheduling terminal device determines at least one transmission resource from a preconfigured resource pool.

The transmission resource is for a sending terminal device to perform sidelink (sidelink) transmission.

Optionally, before the scheduling terminal device determines the at least one transmission resource, the scheduling terminal device receives a resource request from the sending terminal device.

S1401. The scheduling terminal device sends a first message to the sending terminal device, where the first message is used to indicate the transmission resource.

S1402. The sending terminal device receives the first message, and sends sidelink data to a receiving terminal device based on the transmission resource in the first message.

S1403. After receiving the sidelink data sent by the sending terminal device, the receiving terminal device decodes the sidelink data.

S1404. The receiving terminal device determines a result of decoding the sidelink data, and sends a fourth message to the sending terminal device.

The fourth message is used to indicate the result of decoding, by the receiving terminal device, the data received from the sending device.

Optionally, the fourth message is an SL-HARQ message, and the SL-HARQ message includes an ACK or a NACK. The ACK is used to indicate that the decoding succeeds, and the NACK is used to indicate that the decoding fails.

S1405. The sending terminal device sends the fourth message to the scheduling terminal device.

S1406. The scheduling terminal device performs retransmission scheduling after determining, based on the fourth message, that the decoding result is a failure.

Optionally, when the decoding result is the failure, S1402 continues to be performed until the scheduling terminal device receives the fourth message indicating that the decoding succeeds.

Optionally, when the decoding result is the failure, S1402 continues to be performed. If the fourth message indicating that the decoding succeeds is still not received after S1402 is repeatedly performed N times, the operation ends. N may be a maximum quantity of retransmission times. According to the foregoing method, in embodiments of this application, when only the mode 2(d) is supported, a retransmission scheduling procedure based on a HARQ feedback requested by the sending terminal device and a bearer relationship of related signaling are provided, to clarify a relationship and functions of the sending terminal device, the scheduling terminal device, and a network side device in the scheduling procedure, and to further improve an overall procedure and a design of the mode 2(d).

Figure 15:
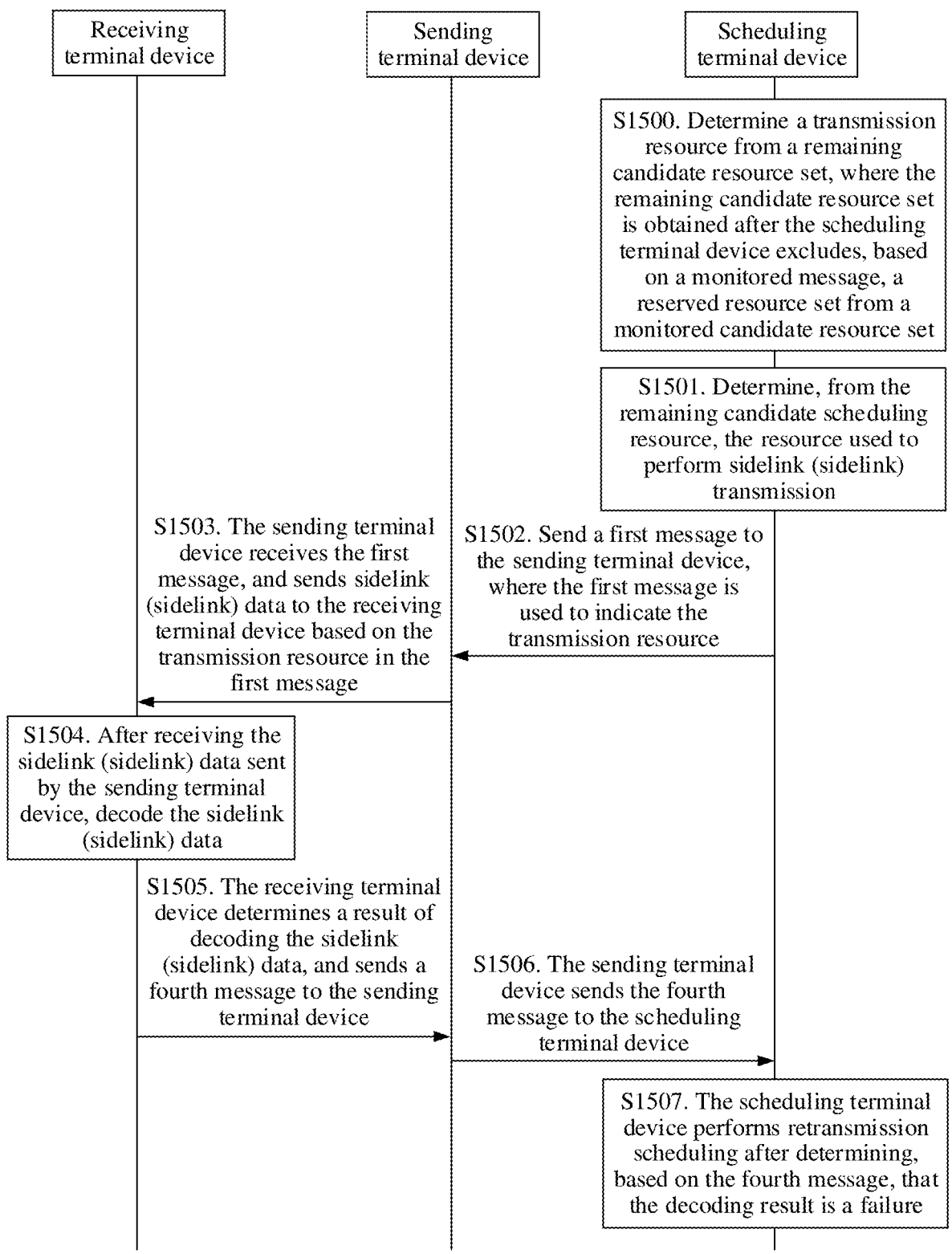
FIG. 15 is a schematic diagram of a third scheduling procedure in a HARQ retransmission scenario according to an embodiment of this application.

Scheduling case 3: The scheduling terminal device supports the mode 2(a) and the mode 2(d). As shown in FIG. 15, resource scheduling in this application includes the following steps.

S1500. A scheduling terminal device determines a transmission resource from a remaining candidate resource set, where the remaining candidate resource set is obtained after the scheduling terminal device excludes, based on a monitored message, a reserved resource set from a monitored candidate resource set.

Optionally, before the scheduling terminal device determines at least one transmission resource, the scheduling terminal device receives a resource request from a sending terminal device.

S1501. The scheduling terminal device determines, from the remaining candidate scheduling resource, the resource used to perform sidelink transmission.

There may be one or more resources that are determined by the scheduling terminal device and that are used to perform sidelink transmission. The "more" indicates greater than or equal to two.

S1502. The scheduling terminal device sends a first message to the sending terminal device, where the first message is used to indicate the transmission resource.

S1503. The sending terminal device receives the first message, and sends sidelink data to a receiving terminal device based on the transmission resource in the first message.

S1504. After receiving the sidelink data sent by the sending terminal device, the receiving terminal device decodes the sidelink data.

S1505. The receiving terminal device determines a result of decoding the sidelink data, and sends a fourth message to the sending terminal device.

The fourth message is used to indicate the result of decoding, by the receiving terminal device, the data received from the sending device.

Optionally, the fourth message is an SL-HARQ message, and the SL-HARQ message includes an ACK or a NACK. The ACK is used to indicate that the decoding succeeds, and the NACK is used to indicate that the decoding fails.

S1506. The sending terminal device sends the fourth message to the scheduling terminal device.

S1507. The scheduling terminal device performs retransmission scheduling after determining, based on the fourth message, that the decoding result is a failure.

Optionally, when the decoding result is the failure, S1502 continues to be performed until the scheduling terminal device receives the fourth message indicating that the decoding succeeds.

Optionally, when the decoding result is the failure, S1502 continues to be performed. If the fourth message indicating that the decoding succeeds is still not received after S1502 is repeatedly performed N times, the operation ends. N may be a maximum quantity of retransmission times.

According to the foregoing method, in embodiments of this application, when only the mode 2(a) and the mode 2(d) are supported, a retransmission scheduling procedure based on a HARQ feedback requested by the sending terminal device and a bearer relationship of related signaling are provided, to clarify a relationship and functions of the sending terminal device, the scheduling terminal device, and a base station in the scheduling procedure, and to further improve an overall procedure and a design of the mode 2(d).

It should be noted that the transmission resource in embodiments of this application includes a same transport block or a plurality of transport blocks.

Based on the foregoing descriptions of the solutions in this application, it may be understood that, to implement the foregoing functions, the foregoing devices include corresponding hardware structures and/or software modules for performing the functions. A person skilled in the art should easily be aware that, in combination with the units and algorithm steps in the examples described in embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 16:
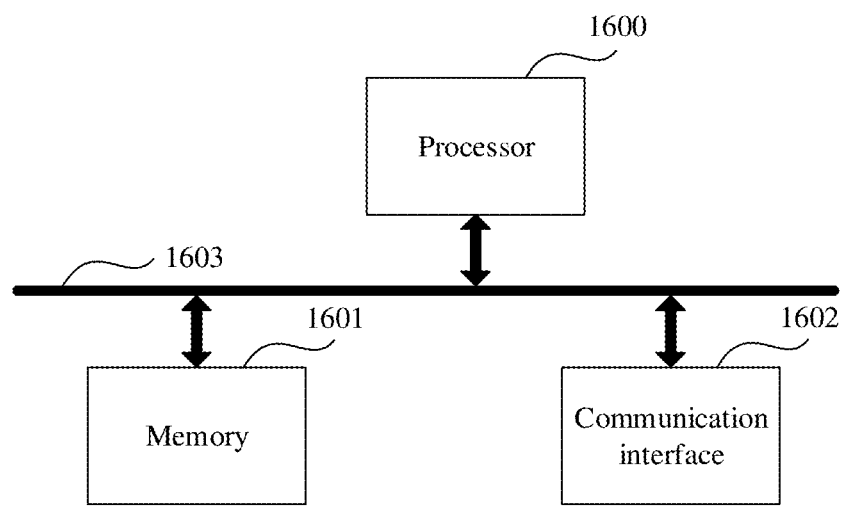
FIG. 16 is a schematic diagram of a first scheduling terminal device according to this application.

Based on the foregoing embodiment, as shown in FIG. 16, this application provides a resource scheduling device. The device may be a scheduling terminal device, and the scheduling terminal device includes a processor 1600, a memory 1601, and a communication interface 1602.

The processor 1600 is responsible for managing a bus architecture and common processing, and the memory 1601 may store data used when the processor 1600 performs an operation. The communication interface 1602 is configured to send and receive data under control of the processor 1600, to perform data communication with the memory 1601.

The processor 1600 may be a central processing unit (central processing unit, CPU), a network processor (network processor, NP), or a combination of the CPU and the NP. The processor 1600 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof. The memory 1601 may include: any medium that can store program code, such as a USB flash drive, a removable hard disk, a read-only memory (read-only memory, ROM), a random access memory (random access memory, RAM), a magnetic disk, or an optical disc.

The processor 1600, the memory 1601, and the communication interface 1602 are connected to each other. Optionally, the processor 1600, the memory 1601, and the communication interface 1602 may be connected to each other by using a bus 1603. The bus 1603 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, the bus is represented by using only one bold line in FIG. 16, but it does not indicate that there is only one bus or only one type of bus.

Figure 4:
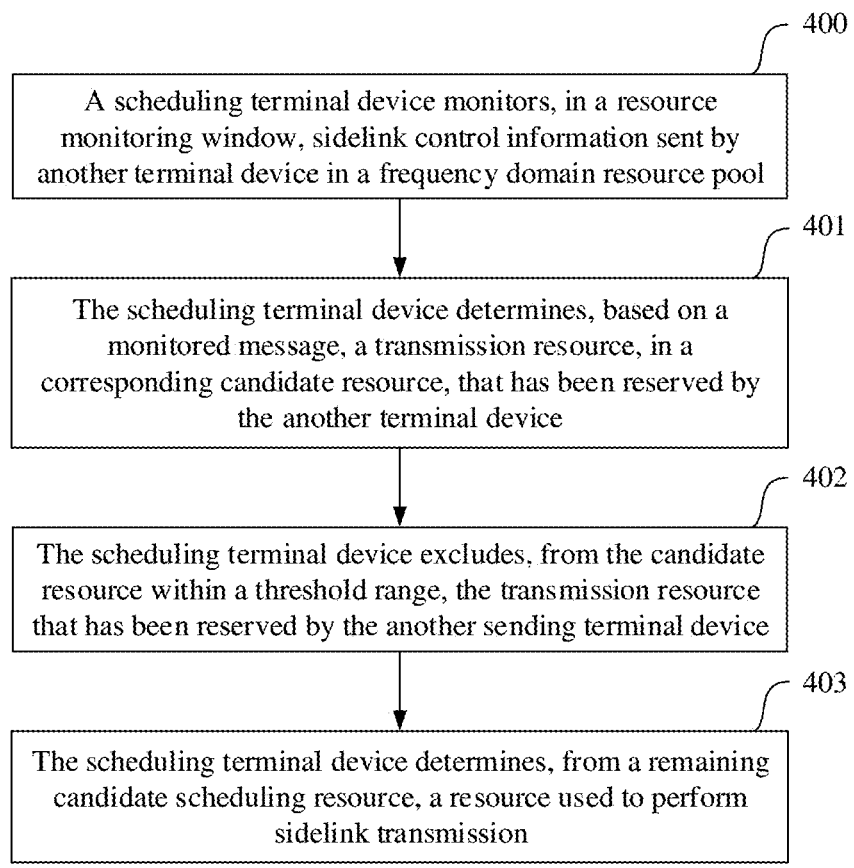
FIG. 4 is a schematic flowchart of determining a transmission resource according to an embodiment of this application.
Figure 7:
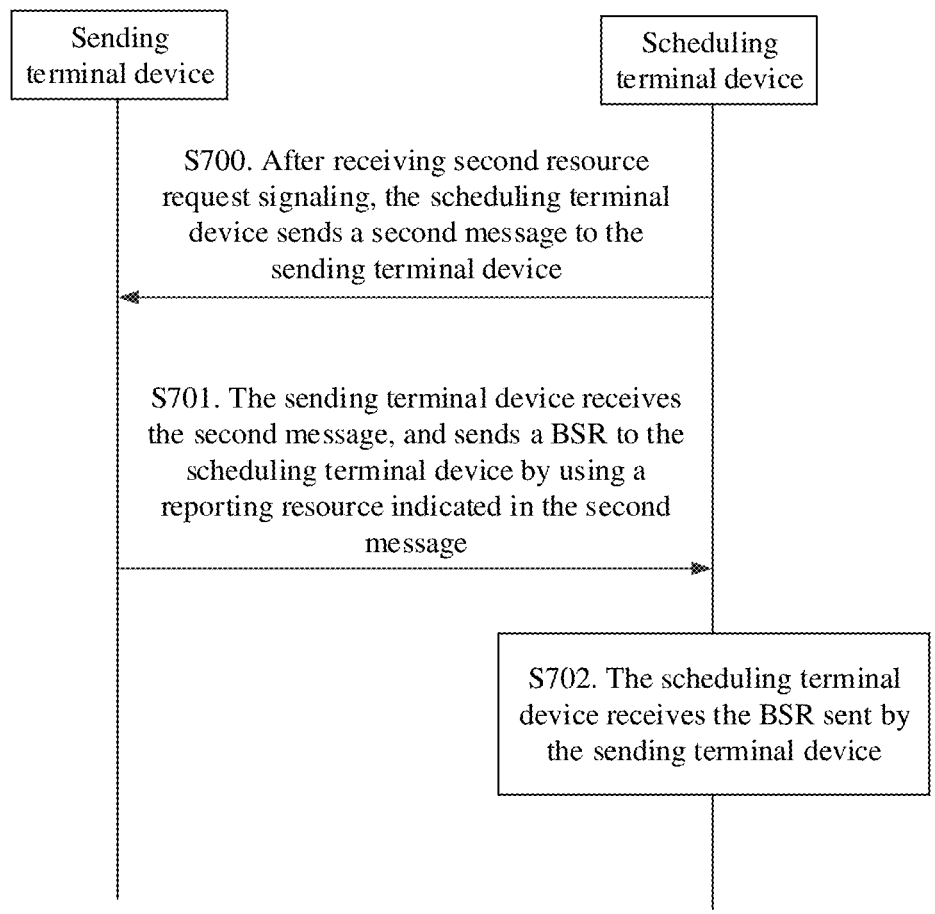
FIG. 7 is a schematic flowchart of obtaining a BSR according to an embodiment of this application.

Specifically, the processor 1600 is configured to: read a program in the memory 1601 and perform, for example, the method procedure performed by the scheduling terminal device in S400 to S406 shown in FIG. 4; perform, for example, the method procedure performed by the scheduling terminal device in S700 to S703 shown in FIG. 7; perform, for example, the method procedure performed by the scheduling terminal device in S800 to S806 shown in FIG. 8; perform, for example, the method procedure performed by the scheduling terminal device in S900 to S904 shown in FIG. 9; perform, for example, the method procedure performed by the scheduling terminal device in S1000 to S1005 shown in FIG. 10; perform, for example, the method procedure performed by the scheduling terminal device in S1100 to S1103 shown in FIG. 11; perform, for example, the method procedure performed by the scheduling terminal device in S1200 to S1203 shown in FIG. 12; perform, for example, the method procedure performed by the scheduling terminal device in S1300 to S1312 shown in FIG. 13A and FIG. 13B; perform, for example, the method procedure performed by the scheduling terminal device in S1400 to S1406 shown in FIG. 14; or perform, for example, the method procedure performed by the scheduling terminal device in S1500 to S1507 shown in FIG. 15.

Figure 17:
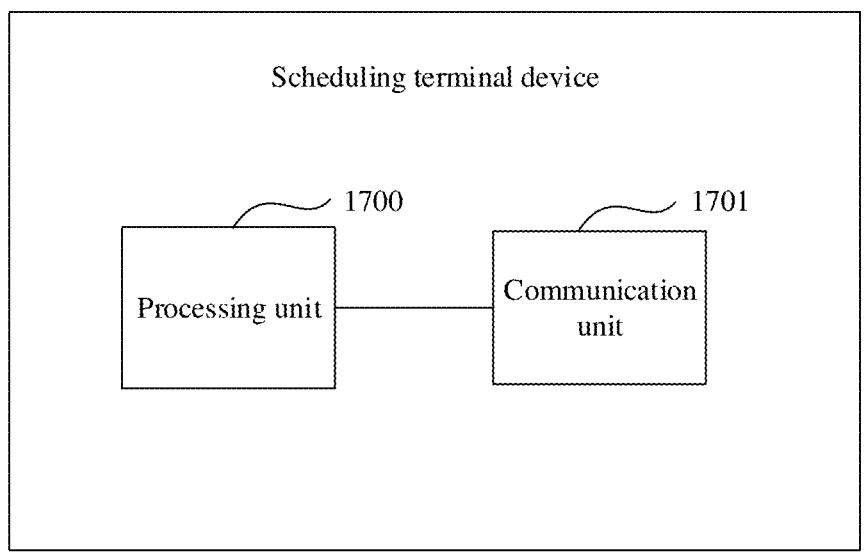
FIG. 17 is a schematic diagram of a second scheduling terminal device according to this application.

As shown in FIG. 17, the present invention provides a scheduling terminal device for resource scheduling, where the scheduling terminal device includes:

a processing unit 1700, configured to determine a resource for a sending terminal device to perform sidelink (sidelink) transmission; and a communication unit 1701, configured to send a first message to the sending terminal device, where the first message is used to indicate the transmission resource.

The resource is specifically used to perform a part or all of the following: transmission of data information, transmission of control information, and transmission of feedback information.

Functions of the processing unit 1700 and the communication unit 1701 shown in FIG. 17 may be performed by a processor 1700 by reading a program in a memory 1701, or may be independently performed by the processor 1700.

Optionally, when the scheduling terminal device runs, the processing unit 1701 and the communication unit 1700 may perform, for example, the method procedure performed by the scheduling terminal device in S400 to S406 shown in FIG. 4; perform, for example, the method procedure performed by the scheduling terminal device in S700 to S703 shown in FIG. 7; perform, for example, the method procedure performed by the scheduling terminal device in S800 to S806 shown in FIG. 8; perform, for example, the method procedure performed by the scheduling terminal device in S900 to S904 shown in FIG. 9; perform, for example, the method procedure performed by the scheduling terminal device in S1000 to S1005 shown in FIG. 10; perform, for example, the method procedure performed by the scheduling terminal device in S1100 to S1103 shown in FIG. 11; perform, for example, the method procedure performed by the scheduling terminal device in S1200 to S1203 shown in FIG. 12; perform, for example, the method procedure performed by the scheduling terminal device in S1300 to S1312 shown in FIG. 13A and FIG. 13B; perform, for example, the method procedure performed by the scheduling terminal device in S1400 to S1406 shown in FIG. 14; or perform, for example, the method procedure performed by the scheduling terminal device in S1500 to S1507 shown in FIG. 15.

It should be noted that the communication unit 1701 may include different communication units that respectively correspond to different communication interfaces.

For detailed descriptions of functions or operations performed by the scheduling terminal device provided in this application, refer to the steps performed by the scheduling terminal device in the method embodiments of this application. Details are not described herein again.

Figure 18:
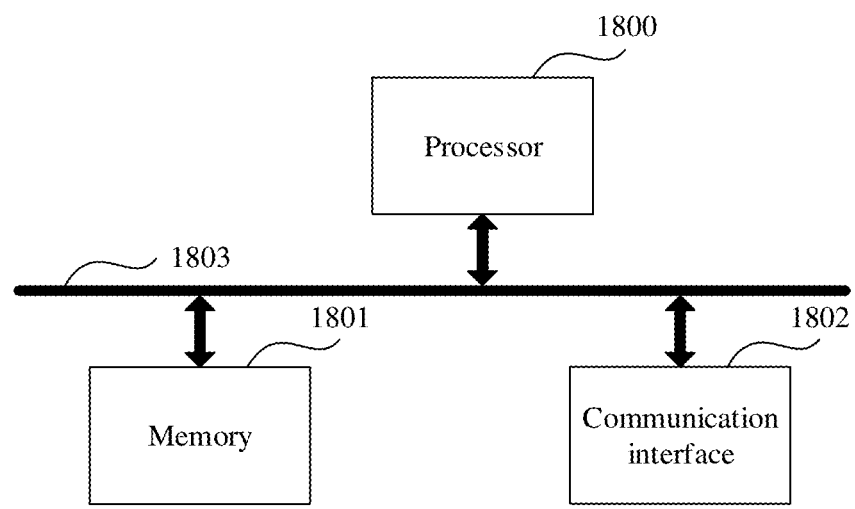
FIG. 18 is a schematic diagram of a first sending terminal device according to this application.

Based on the foregoing embodiment, as shown in FIG. 18, this application provides a resource scheduling device. The device may be a sending terminal device, and the sending terminal device includes a processor 1800, a memory 1801, and a communication interface 1802.

The processor 1800 is responsible for managing a bus architecture and common processing, and the memory 1801 may store data used when the processor 1800 performs an operation. The communication interface 1802 is configured to send and receive data under control of the processor 1800, to perform data communication with the memory 1801.

The processor 1800 may be a central processing unit (central processing unit, CPU), a network processor (network processor, NP), or a combination of the CPU and the NP. The processor 1800 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof. The memory 1801 may include: any medium that can store program code, such as a USB flash drive, a removable hard disk, a read-only memory (read-only memory, ROM), a random access memory (random access memory, RAM), a magnetic disk, or an optical disc.

The processor 1800, the memory 1801, and the communication interface 1802 are connected to each other. Optionally, the processor 1800, the memory 1801, and the communication interface 1802 may be connected to each other by using a bus 1803. The bus 1803 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, the bus is represented by using only one bold line in FIG. 18, but it does not indicate that there is only one bus or only one type of bus.

Specifically, the processor 1800 is configured to: read a program in the memory 1801 and perform, for example, the method procedure performed by the scheduling terminal device in S400 to S406 shown in FIG. 4; perform, for example, the method procedure performed by the scheduling terminal device in S700 to S703 shown in FIG. 7; perform, for example, the method procedure performed by the scheduling terminal device in S800 to S806 shown in FIG. 8; perform, for example, the method procedure performed by the scheduling terminal device in S900 to S904 shown in FIG. 9; perform, for example, the method procedure performed by the scheduling terminal device in S1000 to S1005 shown in FIG. 10; perform, for example, the method procedure performed by the scheduling terminal device in S1100 to S1103 shown in FIG. 11; perform, for example, the method procedure performed by the scheduling terminal device in S1200 to S1203 shown in FIG. 12; perform, for example, the method procedure performed by the scheduling terminal device in S1300 to S1312 shown in FIG. 13A and FIG. 13B; perform, for example, the method procedure performed by the scheduling terminal device in S1400 to S1406 shown in FIG. 14; or perform, for example, the method procedure performed by the scheduling terminal device in S1500 to S1507 shown in FIG. 15.

Figure 19:
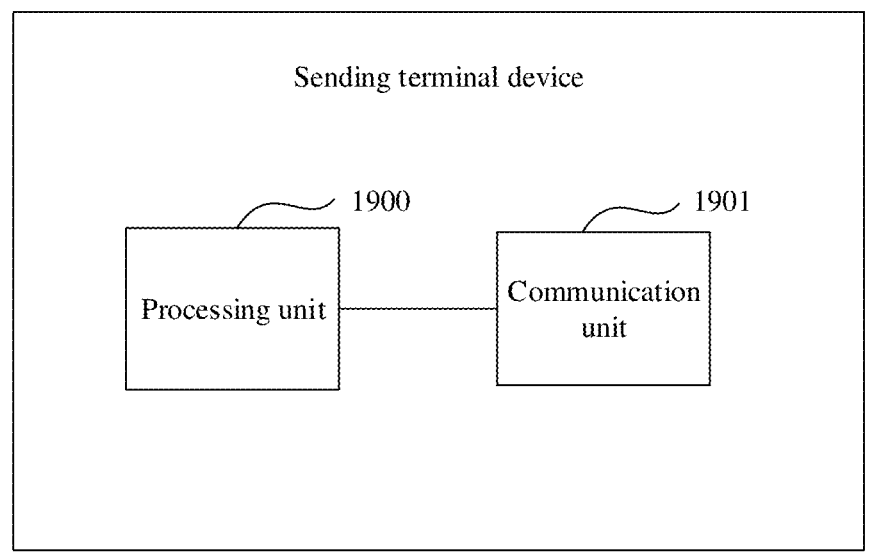
FIG. 19 is a schematic diagram of a second sending terminal device according to this application.

As shown in FIG. 19, the present invention provides a sending terminal device for resource scheduling. The sending terminal device includes:

a communication unit 1901, configured to receive a first message from a scheduling terminal device, where the first message is used to indicate a resource used by the sending terminal device to perform sidelink transmission; and a processing unit 1900, configured to perform a part or all of the following steps on a receiving terminal device by using the transmission resource: transmission of data information, transmission of control information, and transmission of feedback information.

Functions of the processing unit 1900 and the communication unit 1901 shown in FIG. 19 may be performed by the processor 1800 by reading a program in the memory 1801, or may be independently performed by the processor 1800.

Optionally, when the sending terminal device runs, the processing unit 1801 and the communication unit 1800 may perform, for example, the method procedure performed by the scheduling terminal device in S400 to S406 shown in FIG. 4; perform, for example, the method procedure performed by the scheduling terminal device in S700 to S703 shown in FIG. 7; perform, for example, the method procedure performed by the scheduling terminal device in S800 to S806 shown in FIG. 8; perform, for example, the method procedure performed by the scheduling terminal device in S900 to S904 shown in FIG. 9; perform, for example, the method procedure performed by the scheduling terminal device in S1000 to S1005 shown in FIG. 10; perform, for example, the method procedure performed by the scheduling terminal device in S1100 to S1103 shown in FIG. 11; perform, for example, the method procedure performed by the scheduling terminal device in S1200 to S1203 shown in FIG. 12; perform, for example, the method procedure performed by the scheduling terminal device in S1300 to S1312 shown in FIG. 13A and FIG. 13B; perform, for example, the method procedure performed by the scheduling terminal device in S1400 to S1406 shown in FIG. 14; or perform, for example, the method procedure performed by the scheduling terminal device in S1500 to S1507 shown in FIG. 15.

It should be noted that the communication unit 1901 may include different communication units that respectively correspond to different communication interfaces.

For detailed descriptions of functions or operations performed by the sending terminal device provided in this application, refer to the steps performed by the sending terminal device in the method embodiments of this application. Details are not described herein again.

An embodiment of this application further provides a communication system. The communication system includes a scheduling terminal device, a sending terminal device, and a receiving terminal device. Optionally, the communication system may further include a network side device.

The scheduling terminal device may be the scheduling terminal device shown in FIG. 15 or FIG. 17, and the sending terminal device may be the sending terminal device shown in FIG. 18 or FIG. 19.

When the communication system runs, the scheduling terminal device and the sending terminal device may perform, for example, the method procedure performed by the scheduling terminal device in S400 to S406 shown in FIG. 4; perform, for example, the method procedure performed by the scheduling terminal device in S700 to S703 shown in FIG. 7; perform, for example, the method procedure performed by the scheduling terminal device in S800 to S806 shown in FIG. 8; perform, for example, the method procedure performed by the scheduling terminal device in S900 to S904 shown in FIG. 9; perform, for example, the method procedure performed by the scheduling terminal device in S1000 to S1005 shown in FIG. 10; perform, for example, the method procedure performed by the scheduling terminal device in S1100 to S1103 shown in FIG. 11; perform, for example, the method procedure performed by the scheduling terminal device in S1200 to S1203 shown in FIG. 12; perform, for example, the method procedure performed by the scheduling terminal device in S1300 to S1312 shown in FIG. 13A and FIG. 13B; perform, for example, the method procedure performed by the scheduling terminal device in S1400 to S1406 shown in FIG. 14; or perform, for example, the method procedure performed by the scheduling terminal device in S1500 to S1507 shown in FIG. 15.

Figure 20:
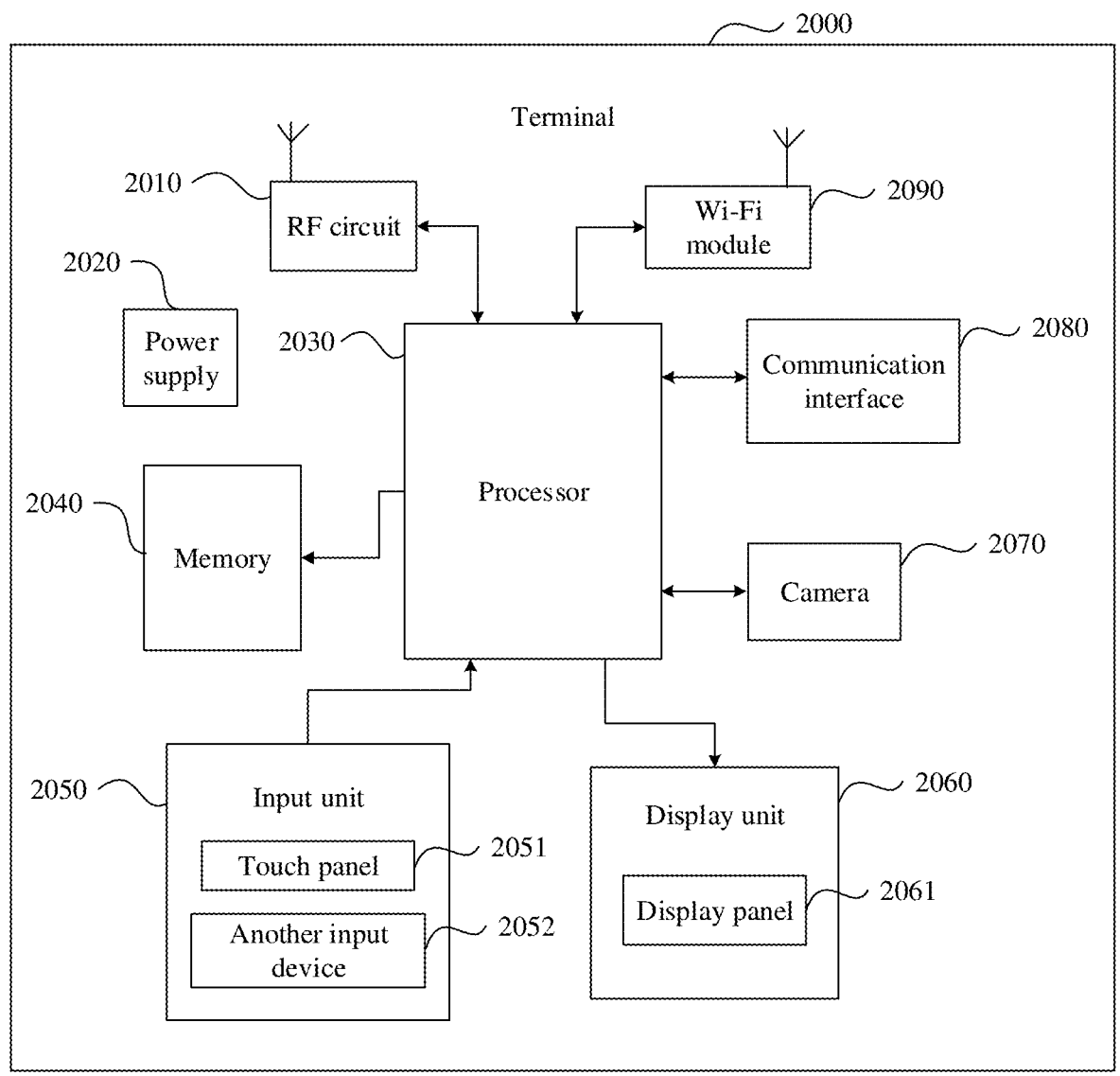
FIG. 20 is a schematic diagram of a terminal device according to this application.

Based on a same concept, an embodiment of the present invention provides a terminal device. The terminal device may be the scheduling terminal device and/or the sending terminal device. As shown in FIG. 20, the terminal 2000 includes components such as a radio frequency (Radio Frequency, RF) circuit 2010, a power supply 2020, a processor 2030, a memory 2040, an input unit 2050, a display unit 2060, a camera 2070, a communication interface 2080, and a wireless fidelity (Wireless Fidelity, Wi-Fi) module 2090. A person skilled in the art may understand that a structure of the terminal shown in FIG. 20 does not constitute a limitation on the terminal, and the terminal provided in this embodiment of this application may include more or fewer components than those shown in the figure, or some components may be combined, or have different component arrangements.

The following describes the components of the terminal 2000 in detail with reference to FIG. 20.

The RF circuit 2010 may be configured to send and receive data in a communication or call process. Specifically, after receiving downlink data from a base station, the RF circuit 2010 sends the downlink data to the processor 2030 for processing, and sends to-be-sent uplink data to the base station. Usually, the RF circuit 1810 includes but is not limited to an antenna, at least one amplifier, a transceiver, a coupler, a low noise amplifier (Low Noise Amplifier, LNA), a duplexer, and the like.

In addition, the RF circuit 2010 may further communicate with a network and another terminal through wireless communication. Any communication standard or protocol may be used for the wireless communication, including but not limited to global system for mobile communications (global system for mobile communications, GSM), general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Messaging Service, SMS), and the like.

A Wi-Fi technology is a short-range wireless transmission technology. The terminal 2000 may be connected to an access point (Access Point, AP) by using the Wi-Fi module 2090, to access a data network. The Wi-Fi module 2090 may be configured to send and receive data in a communication process.

The terminal 2000 may be physically connected to another terminal by using the communication interface 2080. Optionally, the communication interface 2080 is connected to a communication interface of the another terminal by using a cable, to implement data transmission between the terminal 2000 and the another terminal.

The terminal 2000 can implement a communication service and send a message to another contact. Therefore, the terminal 2000 needs to have a data transmission function, that is, the terminal 2000 needs to include a communication module inside. Although FIG. 20 shows communication modules such as the RF circuit 2010, the Wi-Fi module 2090, and the communication interface 2080, it may be understood that the terminal 2000 includes at least one of the foregoing components or another communication module (for example, a Bluetooth module) configured to implement communication, to perform data transmission.

The memory 2040 may be configured to store a software program and a module. The processor 2030 executes various function applications of the terminal 2000 and data processing by running the software program and the module that are stored in the memory 2040. In addition, after executing program code in the memory 2040, the processor 2030 may implement a part or all of the processes in embodiments of the present invention.

Optionally, the memory 2040 may mainly include a program storage area and a data storage area. The program storage area may store an operating system, various application programs (for example, a communication application), a facial recognition module, and the like. The data storage area may store data (for example, multimedia files such as various pictures and video files, and a face message template) created based on use of the terminal, and the like.

In addition, the memory 2040 may include a high-speed random access memory, and may further include a non-volatile memory, for example, at least one magnetic disk storage device, a flash memory device, or another volatile solid-state storage device.

The input unit 2050 may be configured to receive a digit or character message entered by a user, and generate key signal input related to user settings and function control of the terminal 2000.

Optionally, the input unit 2050 may include a touch panel 2051 and another input terminal 2052.

The touch panel 2051, which is also referred to as a touchscreen, may collect a touch operation of the user on or near the touch panel 2051 (for example, an operation of the user on or near the touch panel 2051 by using any suitable object or accessory such as a finger or a stylus), and drive a corresponding connection apparatus based on a preset program. Optionally, the touch panel 2051 may include two parts: a touch detection apparatus and a touch controller. The touch detection apparatus detects a location touched by the user, detects a signal brought by the touch operation, and transmits the signal to the touch controller. The touch controller receives touch information from the touch detection apparatus, converts the touch message into coordinates of the touch point, and sends the coordinates of the touch point to the processor 2030, and can receive and execute a command sent by the processor 2030. In addition, the touch panel 2051 may be implemented in a plurality of types, such as a resistive type, a capacitive type, an infrared type, and a surface acoustic wave type.

Optionally, the another input terminal 2052 may include but is not limited to one or more of a physical keyboard, a function key (for example, a volume control key or a switch key), a trackball, a mouse, a joystick, and the like.

The display unit 2060 may be configured to display a message entered by the user or a message provided for the user, and various menus of the terminal 2000. The display unit 2060 is a display system of the terminal 2000, and is configured to present a screen to implement human-computer interaction.

The display unit 2060 may include a display panel 2061. Optionally, the display panel 2061 may be configured in a form of a liquid crystal display (Liquid Crystal Display, LCD), an organic light-emitting diode (Organic Light-Emitting Diode, OLED), or the like.

Further, the touch panel 2051 may cover the display panel 2061. After detecting a touch operation on or near the touch panel 2051, the touch panel 2051 transmits information about the touch operation to the processor 2030 to determine a touch event type. Then the processor 2030 provides corresponding visual output on the display panel 2061 based on the touch event type.

In FIG. 20, the touch panel 2051 and the display panel 2061 act as two independent components to implement input and output functions of the terminal 2000. However, in some embodiments, the touch panel 2051 and the display panel 2061 may be integrated to implement the input and output functions of the terminal 2000.

The processor 2030 is a control center of the terminal 2000, is connected to all components by using various interfaces and lines, and performs various functions of the terminal 2000 and processes data by running or executing the software program and/or the module stored in the memory 2040 and invoking data stored in the memory 2040. Therefore, a plurality of services based on the terminal are implemented.

Optionally, the processor 2030 may include one or more processing units. Optionally, the processor 2030 may integrate an application processor and a modem processor, where the application processor mainly processes an operating system, a user interface, an application program, and the like, and the modem processor mainly processes wireless communication. It may be understood that the modem processor may alternatively not be integrated into the processor 2030.

The camera 2070 is configured to implement a photographing function of the terminal 2000, to take a picture or shoot a video. The camera 2070 may further be configured to: implement a scanning function of the terminal 2000, and scan a to-be-scanned object (a two-dimensional code/bar code).

The terminal 2000 further includes the power supply 2020 (for example, a battery) configured to supply power to the components. Optionally, the power supply 2020 may be logically connected to the processor 2030 by using a power supply management system, to implement functions such as charging, discharging, and power consumption management by using the power supply management system.

Although not shown, the terminal 2000 may further include at least one sensor, an audio frequency circuit, and the like, and details are not described herein.

The memory 2040 may store program code that is the same as that of a storage unit 2001, and when the program code is executed by the processor 2030, the processor 2030 is enabled to implement all functions of a processing unit 2000.

In some possible implementations, aspects of the resource scheduling method provided in embodiments of the present invention may also be implemented in a form of a program product, and the program product includes program code. When the program code is run on a computer device, the program code is used to enable the computer device to perform the steps in the resource scheduling method described in this specification according to various example implementations of the present invention.

The program product may be any combination of one or more readable media. The readable medium may be a readable signal medium or a readable storage medium. For example, the readable storage medium may be, but is not limited to, an electrical, magnetic, optical, electromagnetic, infrared, or semiconductor system, apparatus or device, or any combination thereof. More specific examples (non-exhaustive list) of the readable storage medium in this embodiment of this application include: an electrical connection having one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination thereof.

A program product for resource scheduling according to an implementation of the present invention may use the portable compact disc read-only memory (CD-ROM) and include the program code, and may run on a server device. However, the program product in the present invention is not limited thereto. In this specification, the readable storage medium may be any tangible medium including or storing a program. The program may be transmitted by using a message, or used by or in combination with an apparatus or a device.

The readable signal medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. The readable signal medium may alternatively be any readable medium other than the readable storage medium. The readable medium may send, propagate, or transmit a program used by or in combination with a periodic network action system, apparatus, or device.

The program code included in the readable medium may be transmitted by using any appropriate medium, including but not limited to a wireless medium, a wired medium, an optical cable, an RF medium, or any appropriate combination thereof.

The program code used to perform the operations of the present invention may be written in any combination of one or more program design languages. The program design languages include an object-oriented program design language such as Java and C++, and further include a conventional procedural program design language such as a "C" language or a similar program design language. The program code may be completely executed on a user's computing device, partially executed on user equipment, executed as an independent software package, partially executed on the user's computing device and partially executed on a remote computing device, or completely executed on the remote computing device or server. When the program code is executed on the remote computing device, the remote computing device may be connected to the user's computing device by using any type of network, including a local area network (LAN) or a wide area network (WAN), or may be connected to an external computing device.

An embodiment of this application further provides a computing device readable storage medium for the resource scheduling method, so that content is not lost after power is off. The storage medium stores a software program, including program code. When the program code is run on a computing device, and the software program is read and executed by one or more processors, any resource scheduling solution in embodiments of this application may be implemented.

The foregoing describes this application with reference to the block diagrams and/or flowcharts of the method, the apparatus (system), and/or the computer program product in embodiments of this application. It should be understood that a block of the block diagrams and/or flowcharts and a combination of blocks of the block diagrams and/or flowcharts, can be implemented by using computer program instructions. These computer program instructions may be provided to a processor of a general-purpose computer, a processor of a dedicated computer, and/or another programmable data processing apparatus to produce a machine, so that the instructions executed by the processor of the computer and/or the another programmable data processing apparatus create/creates a method for implementing a specific function/action in the block of the block diagrams and/or flowcharts.

Correspondingly, this application may further be implemented by using hardware and/or software (including firmware, resident software, microcode, and the like). Still further, this application may be in a form of a computer program product on a computer-usable or computer-readable storage medium. The computer program product has computer-usable or computer-readable program code implemented in the medium, to be used by an instruction execution system or used in combination with an instruction execution system. In the context of this application, the computer-usable or computer-readable medium may be any medium, and may include, store, communicate, transmit, or transfer a program, for use by an instruction execution system, apparatus, or device or used in combination with an instruction execution system, apparatus, or device.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A resource scheduling method, wherein the method comprises:
   receiving, by a scheduling terminal device, a first resource request sent by a sending terminal device,
   sending, by the scheduling terminal device, a first message to the sending terminal device, wherein the first message indicates a reporting resource for the sending terminal device to report a second message, and the second message comprises a buffer status report (BSR), so that the sending terminal device sends the second message to the scheduling terminal device by using the reporting resource;
   determining, by the scheduling terminal device, a transmission resource for the sending terminal device to perform sidelink transmission; and
   sending, by the scheduling terminal device, a third message to the sending terminal device, wherein
   the third message indicates the transmission resource, and
   the transmission resource is used to perform one or more of transmission of data information, transmission of control information, or transmission of feedback information.

2. The method according to claim 1, wherein the determining, by the scheduling terminal device, the transmission resource for the sending terminal device to perform the sidelink transmission comprises:
   receiving, by the scheduling terminal device, a first resource configuration message sent by a network side device, wherein the first resource configuration message indicates the transmission resource, and the transmission resource is selected by the network side device from a preconfigured resource pool;
   determining, by the scheduling terminal device, the transmission resource from the preconfigured resource pool; or
   determining, by the scheduling terminal device through monitoring, a reserved resource set in a candidate resource set, and excluding the reserved resource set from the candidate resource set, to obtain a remaining candidate resource set; and determining, by the scheduling terminal device, the transmission resource from the remaining candidate resource set.

3. The method according to claim 1, wherein before the determining, by the scheduling terminal device, the transmission resource for the sending terminal device to perform the sidelink transmission, the method further comprises:
   determining, by the scheduling terminal device, that a preset configuration time is satisfied, wherein the preset configuration time is time determined by the scheduling terminal device to configure the transmission resource for the sending terminal device.

4. The method according to claim 3, further comprising:
   receiving, by the scheduling terminal device, a first-second resource request sent by the sending terminal device, wherein the first-second resource request comprises the BSR.

5. The method according to claim 1, wherein the first resource request is free from including the BSR.

6. A resource scheduling method, wherein the method comprises:
   sending, by a sending terminal device, a resource request to a scheduling terminal device;
   receiving, by the sending terminal device, a first message from the scheduling terminal device, wherein the first message indicates a transmission resource for the sending terminal device to perform sidelink transmission;
   in response to receiving a second message from the scheduling terminal device, sending, by the sending terminal device, a third message to the scheduling terminal device, wherein the second message indicates a reporting resource for the sending terminal device to report the third message, the third message comprises a buffer status report (BSR), and the BSR comprises one or more of a buffer size of sidelink data, an index of a receiving terminal device, or transmission priority information; and
   performing, by the sending terminal device using the transmission resource, one or more of transmission of data information, transmission of control information, or transmission of feedback information.

7. The method according to claim 6, wherein the method further comprises:
   receiving, by the sending terminal device, a fourth message from the receiving terminal device, wherein the fourth message is a decoding result of decoding, by the receiving terminal device, the sidelink data sent by the sending terminal device; and
   sending, by the sending terminal device, the fourth message to the scheduling terminal device.

8. The method according to claim 7, wherein
   the fourth message is a sidelink hybrid automatic repeat request (SL-HARQ) message; and
   the SL-HARQ message comprises an acknowledgment ACK, wherein the ACK indicates that the decoding succeeded.

9. The method according to claim 7, wherein the fourth message is a sidelink hybrid automatic repeat request (SL-HARQ) message; and
   the SL-HARQ message comprises an acknowledgment NACK, wherein the NACK indicates that the decoding failed.

10. The method according to claim 6, wherein the resource request is free from including the BSR.

11. A communication device, comprising:
   a processing unit; and
   a communication unit, wherein
   the communication unit is configured to:
      receive a first resource request sent by a sending terminal device,
      send a first message to the sending terminal device, wherein the first message indicates a reporting resource for the sending terminal device to report a second message, and the second message comprises the BSR, so that the sending terminal device sends the second message to a scheduling terminal device by using the reporting resource;

the processing unit is configured to determine a transmission resource for the sending terminal device to perform sidelink transmission; and the communication unit is further configured to send a third message to the sending terminal device, wherein the third message indicates the transmission resource, and the transmission resource is used to perform one or more of transmission of data information, transmission of control information, or transmission of feedback information.

12. The communication device according to claim 11, wherein the communication unit is further configured to receive a first resource configuration message sent by a network side device, wherein the first resource configuration message indicates the transmission resource, and the transmission resource is selected by the network side device from a preconfigured resource pool;

the processing unit is further configured to determine a transmission resource for a sending terminal device to perform sidelink transmission, comprising:

the processing unit is configured to determine the transmission resource from the preconfigured resource pool; or the processing unit is further configured to determine through monitoring, a reserved resource set in a candidate resource set, and exclude the reserved resource set from the candidate resource set, to obtain a remaining candidate resource set; and determine, the transmission resource from the remaining candidate resource set.

13. The communication device according to claim 11, wherein the processing unit is further configured to determine that preset configuration time is satisfied, wherein the preset configuration time is time determined by the communication device to configure the transmission resource for the sending terminal device.

14. The communication device according to claim 13, wherein the communication unit is further configured to receive, a second resource request sent by the sending terminal device, wherein the second resource request comprises the BSR.

15. The communication device according to claim 11, wherein the first resource request is free from including the BSR.

16. A communication device, comprising-comprising:
a processing unit; and
a communication unit,
wherein
the communication unit is configured to:
send a resource request to a scheduling terminal device;
receive a first message from the scheduling terminal device, wherein the first message indicates a transmission resource for a sending terminal device to perform sidelink transmission;
receive a second message from the scheduling terminal device and send a third message to the scheduling terminal device, wherein the second message indicates a reporting resource for the communication device to report the third message, and the third message comprises a buffer status report (BSR); and
the BSR comprises one or more of messages of a buffer size of sidelink data, an index of a receiving terminal device, or transmission priority information; and the processing unit is configured to:
perform, using the transmission resource, one or more of transmission of data information, transmission of control information, or transmission of feedback information.

17. The communication device according to claim 16, wherein the communication unit is further configured to:
receive a fourth message from the receiving terminal device, wherein the fourth message is a decoding result of decoding, by the receiving terminal device, the sidelink data sent by the sending terminal device; and
send the fourth message to the scheduling terminal device.

18. The communication device according to claim 17, wherein
the fourth message is a sidelink hybrid automatic repeat request (SL-HARQ) message; and
the SL-HARQ message comprises an acknowledgment ACK, wherein the ACK indicates that the decoding succeeded.

19. The communication device according to claim 17, wherein the fourth message is a sidelink hybrid automatic repeat request (SL-HARQ) message; and
the SL-HARQ message comprises an acknowledgment NACK, wherein the NACK indicates that the decoding failed.

20. The communication device according to claim 16, wherein the resource request is free from including the BSR.

* * * * *